US010302191B2

(12) United States Patent
Uesugi et al.

(10) Patent No.: US 10,302,191 B2
(45) Date of Patent: May 28, 2019

(54) AUTOMATIC TRANSMISSION AND METHOD OF MANUFACTURING THE SAME

(71) Applicant: Mazda Motor Corporation, Aki-gun, Hiroshima (JP)

(72) Inventors: Tatsuya Uesugi, Onomichi (JP); Kazuhiko Ueda, Hatsukaichi (JP); Shinya Kamada, Kure (JP); Shotaro Nagai, Hiroshima (JP); Koshiro Saji, Tokai (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 251 days.

(21) Appl. No.: 15/211,399

(22) Filed: Jul. 15, 2016

(65) Prior Publication Data

US 2017/0023130 A1 Jan. 26, 2017

(30) Foreign Application Priority Data

Jul. 21, 2015 (JP) .................................. 2015-144317
Sep. 29, 2015 (JP) .................................. 2015-192018

(51) Int. Cl.
*F16H 61/02* (2006.01)
*F16H 57/02* (2012.01)
*F16H 57/04* (2010.01)

(52) U.S. Cl.
CPC ......... *F16H 61/0276* (2013.01); *F16H 57/02* (2013.01); *F16H 57/0424* (2013.01); *F16H 57/0435* (2013.01); *F16H 2057/02017* (2013.01)

(58) Field of Classification Search
CPC ............ F16H 57/0424; F16H 57/0426; F16H 57/0427; F16H 57/0428; F16H 57/0431;
(Continued)

(56) References Cited

U.S. PATENT DOCUMENTS 5,839,327 A * 11/1998 Gage ................... F16H 57/0412
74/607
8,167,609 B2   5/2012 Belzile et al.
(Continued)

FOREIGN PATENT DOCUMENTS

EP   0990820 A2 *  4/2000  ......... F16H 57/0412
JP   S5865492 U    5/1983
(Continued)

OTHER PUBLICATIONS

EPO Translation of the Description of EP 0990820 A2, Neudorfer et al., Apr. 5, 2000. (Year: 2018).*
JPO Translation of JP 0576845 U, Oct. 19, 1993. (Year: 2018).*

*Primary Examiner* — Daniel D Yabut
(74) *Attorney, Agent, or Firm* — Alleman Hall Creasman & Tuttle LLP

(57) ABSTRACT

A transmission is provided including a transmission case accommodating a transmission mechanism, a hydraulic controller having a valve body and a valve for controlling the transmission mechanism, the valve body formed with a valve insertion hole into which the valve is inserted, and an oil path communicating with the valve insertion hole, and an oil storage for storing oil. At least one of the valve body and the oil storage is integrally formed with the transmission case.

8 Claims, 17 Drawing Sheets

(58) Field of Classification Search
CPC ............. F16H 57/0432; F16H 57/0423; F16H 57/0421; F16H 57/042; F16H 57/0435; F16H 57/0454; F16H 57/0453; F16H 57/045; F16H 57/0457; F16H 57/03; F16H 57/0446; F16H 57/02; F16H 2057/02017; F16H 61/0276; F16H 2061/0279; F16H 2061/0281
See application file for complete search history.

(56) References Cited

U.S. PATENT DOCUMENTS

| | | | |
|---|---|---|---|
| 9,927,020 B2 * | 3/2018 | Keeney | F16H 57/037 |
| 2009/0211850 A1 * | 8/2009 | Moorman | F16H 61/0021 |
| | | | 184/6.12 |
| 2010/0180721 A1 | 7/2010 | Quehenberger | |
| 2016/0333792 A1 * | 11/2016 | Viel | F02C 7/06 |

FOREIGN PATENT DOCUMENTS

| | | | |
|---|---|---|---|
| JP | S63130964 A | | 6/1988 |
| JP | H04279711 A | | 10/1992 |
| JP | H0562085 B2 | | 9/1993 |
| JP | 0576845 U | * | 10/1993 |
| JP | H07269683 A | | 10/1995 |
| JP | 3172973 B2 | | 6/2001 |
| JP | 2004180477 A | | 6/2004 |
| JP | 2005273880 A | | 10/2005 |
| JP | 2008132529 A | | 6/2008 |
| JP | 2011025280 A | | 2/2011 |
| JP | 2013253653 A | | 12/2013 |
| JP | 2014119084 A | | 6/2014 |
| JP | 5731658 B2 | | 6/2015 |

* cited by examiner

AUTOMATIC TRANSMISSION AND METHOD OF MANUFACTURING THE SAME

BACKGROUND

The present invention relates to an automatic transmission for a vehicle, which has a hydraulic controller, and a method of manufacturing the automatic transmission.

Generally, automatic transmissions mounted on vehicles include a transmission mechanism having a hydraulic actuator of a frictional engaging element for example, a transmission case accommodating the transmission mechanism, a hydraulic controller for controlling application and discharge of oil pressure to and from the hydraulic actuator, supply of lubricating oil to various parts inside the transmission case, supply of oil to a torque converter, for example.

The hydraulic controller of such an automatic transmission commonly has valve insertion holes to which solenoid valves and spool valves, which constitute a hydraulic control circuit, are inserted, and a valve body formed with oil paths communicating with the valve insertion holes.

As JP2013-253653A discloses, conventionally, a valve body of a hydraulic controller is formed by stacking a plurality of layers of valve body structuring members while sandwiching a separating plate between mating surfaces of the adjacent layers, and fastening them with a plurality of bolts to form units. Each layer of the valve body structuring member is molded by, for example, die casting of aluminum. Thus, high-quality and efficient mass production has become possible.

Valve insertion holes are formed by processing the molded valve body structuring members, and oil paths are formed by the same molds of the valve body structuring members when molding the valve body structuring members. Therefore, each oil path is formed in a valve body structuring member to extend along a mating surface with another valve body structuring member, provided that the oil path opens to the mating surface over an entire length thereof for the sake of convenience in demolding.

In each layer of the valve body structuring member, the opening of the oil path in the mating surface is closed by the separating plate or communicates, through a communication hole formed through the separating plate, with an oil path of an adjacent valve body structuring member via the separating plate.

The valve body structured as above is attached to an outside of a transmission case which is also molded by, for example, die casting of aluminum. Although the valve body is generally fixed to a lower surface of the transmission case by bolts and accommodated inside an oil pan attached below the transmission case, it may alternatively be attached to a side surface or an upper surface, for example, of the transmission case.

The oil paths formed in the valve body communicate with oil paths formed in the transmission case, through communication ports formed in a joining surface of the valve body with the transmission case. Thus, the oil paths of the valve body communicate with an oil-pressure source (e.g., oil pump), a hydraulic actuator of a transmission mechanism, lubricated parts inside the transmission case, and various parts which are applied with oil pressure (e.g., various parts of a torque converter) through the oil paths of the transmission case.

Further, in the case where the valve body is accommodated inside the oil pan, a discharge port of an oil strainer provided inside the oil pan is connected with a suction port formed in a lower surface of the valve body. Thus, by actuating the oil pump, oil stored in the oil pan is supplied to the oil paths of the valve body through the oil strainer.

However, since the conventional valve body formed with the oil paths by the molds is formed by stacking the plurality of valve body structuring members so as to seal each opening formed over the entire length of the oil path for the sake of convenience in the demolding as described above, the entire valve body easily increases in size and weight. Further, to secure a sealing ability at the mating surfaces, a large number of bolts are used to fasten the valve body structuring members with each other and, accordingly, a large number of bosses having a bolt hole are provided to the valve body structuring members, which also causes an increase in the size and weight of the valve body.

Since valve bodies that easily increase in size also project outside the transmission case, a size of the entire automatic transmission also increases. Therefore, there is room for improvement in the mountability of the automatic transmission in the vehicle. Especially, in the case where the valve body and the oil pan are attached below the transmission case, the oil pan is increased in size to an extent that it can accommodate the valve body and projects downward from the transmission case. Thus, a dimension of the automatic transmission in the vertical direction of the vehicle increases and the mountability of the vehicle degrades even worse. Additionally, since the heavier valve body is attached to the transmission case as above, the weight of the entire automatic transmission also increases, which causes fuel performance degradation of the vehicle as well.

Furthermore, the conventional automatic transmission in which the valve body is formed by coupling the plurality of valve body structuring members to each other and attached to the transmission case, also has an issue where the number of components and assembling processes become large.

SUMMARY

The present invention is made in view of the above issues and aims to reduce a size and weight of an automatic transmission, which has a hydraulic controller, and reduce the number of components and assembling processes thereof.

For addressing the above issues, the present invention is characterized by being configured as follows.

According to a first aspect of the present invention, a transmission comprises a transmission case accommodating a transmission mechanism; and a hydraulic controller having a valve body and a valve configured to control the transmission mechanism, the valve body being formed with a valve insertion hole into which the valve is inserted, the valve body also having an oil path communicating with the valve insertion hole. A part of the transmission case is integrally formed with the valve body. In accordance with this configuration, the amount of raw materials and the number of bolts and holes required for manufacturing the transmission case and the valve body are reduced. This achieves savings in weight and size of the transmission, thereby also achieving greater fuel economy for the vehicle.

According to a second aspect of the present invention, a transmission comprises a transmission case accommodating a transmission mechanism; a hydraulic controller having a valve body and a valve configured to control the transmission mechanism, the valve body being formed with a valve insertion hole into which the valve is inserted, the valve body also having an oil path communicating with the valve insertion hole; and an oil storage configured to store oil. At least one of the valve body and the oil storage is integrally formed with the transmission case. This also achieves the potential advantage of achieving savings in weight and size of the transmission to also achieve greater fuel economy for the vehicle. Moreover, when the oil storage is integrally formed with the transmission case, an oil pan is no longer needed underneath the transmission case. This achieves the potential advantage of improving flexibility in the configuration of the transmission in the up-and-down directions of the vehicle. For example, the power train could be configured lower in the vehicle body.

According to the second aspect, the valve body extends along an outer circumference of the transmission mechanism. This achieves the potential advantage of making the transmission more compact in the radial direction, thereby improving flexibility in the configuration of the transmission.

According to the second aspect, the valve body is integrally formed with the transmission case by a three-dimensional additive manufacturing method, and an axis of the transmission mechanism and an axis of the valve insertion hole are disposed in a laminating direction of the three-dimensional additive manufacturing method. This achieves the potential advantage of improving stability during the three-dimensional additive manufacturing process, thereby improving the quality of the manufacture of the valve body and its insertion holes, and also smoothening the motions of the spools that are accommodated within the insertion holes.

According to the second aspect, a spline, to which an outer circumferential part of a friction plate of a brake of the transmission mechanism is fitted, is formed along an inner circumference of the valve body, and at least a part of the valve insertion hole is located in at least one of a plurality of inward protrusions that form teeth of the spline. This achieves the potential advantage of making the transmission more compact in the radial direction, thereby improving flexibility in the configuration of the transmission.

According to the second aspect, the transmission further comprises a communicating section communicating an internal space of the oil storage with an internal space of the transmission case; and a valve configured to open and close the communicating section. This achieves the potential advantage of stabilizing the oil level.

According to a third aspect of the present invention, the oil storage includes an outer wall part forming an outer surface of a circumferential wall of the transmission case, and an inner wall part disposed on an inner side of the outer wall part at a predetermined interval therefrom to form an inner surface of the circumferential wall, and the oil storage is provided with a pillar-shaped supporting part integrally connecting the outer wall part with the inner wall part. This achieves the potential advantage of reinforcing the structural integrity of the circumferential walls.

According to the third aspect, the transmission case is a cylindrical member extending in axial directions of the transmission mechanism. This achieves the potential advantage of reducing deformation of the transmission case, thereby improving the manufacture of the oil storage and transmission case.

According to the third aspect, the transmission further comprises a communicating section communicating an internal space of the oil storage with an internal space of the transmission case; and a valve configured to open and close the communicating section. This achieves the potential advantage of stabilizing the oil level.

According to a fourth aspect of the present invention, the transmission case is a cylindrical member extending in axial directions of the transmission mechanism. This achieves the potential advantage of reducing deformation of the transmission case, thereby improving the manufacture of the oil storage and transmission case.

According to the fourth aspect, the transmission further comprises a communicating section communicating an internal space of the oil storage with an internal space of the transmission case; and a valve configured to open and close the communicating section. This achieves the potential advantage of stabilizing the oil level.

According to a fifth aspect of the present invention, a transmission comprises a transmission mechanism having a rotary body, a transmission case accommodating the transmission mechanism; and an oil storage configured to store oil. The oil storage is integrally provided with at least a part of a circumferential wall of the transmission case. This achieves the potential advantage of improving flexibility in how the parts within the transmission are laid out and configured, so that the transmission can be made more compact.

DETAILED DESCRIPTION OF EMBODIMENTS

Hereinafter, a plurality of embodiments of a structure of an automatic transmission according to the present invention are respectively described with reference to the appended drawings.

First Embodiment

First, an automatic transmission 1 according to a first embodiment of the present invention is described with reference to FIGS. 1 to 7.

Figure 1:
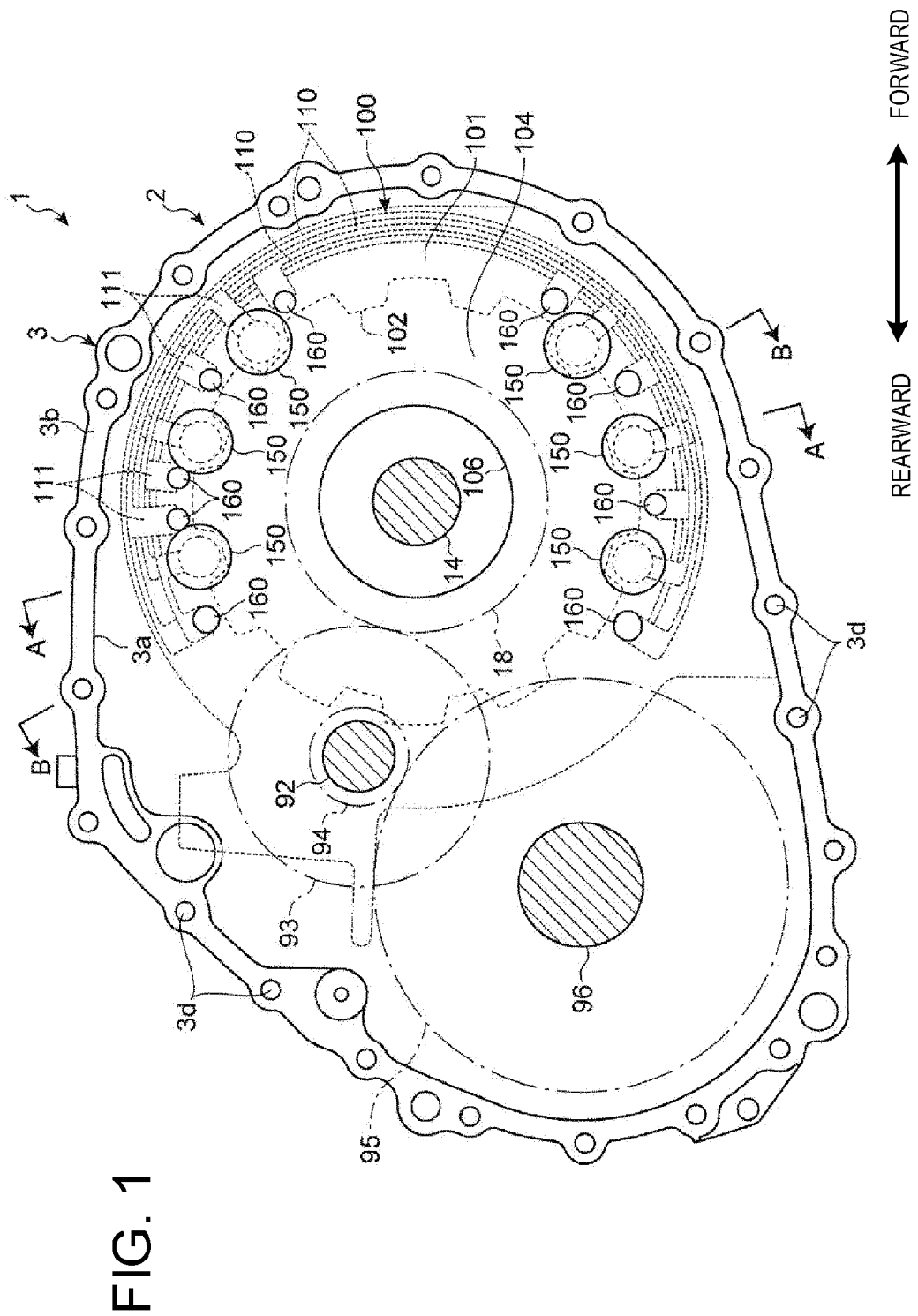
FIG. 1 is a schematic view of an internal structure of an automatic transmission according to a first embodiment of the present invention, seen from a drive source side in axial directions.
Figure 2:
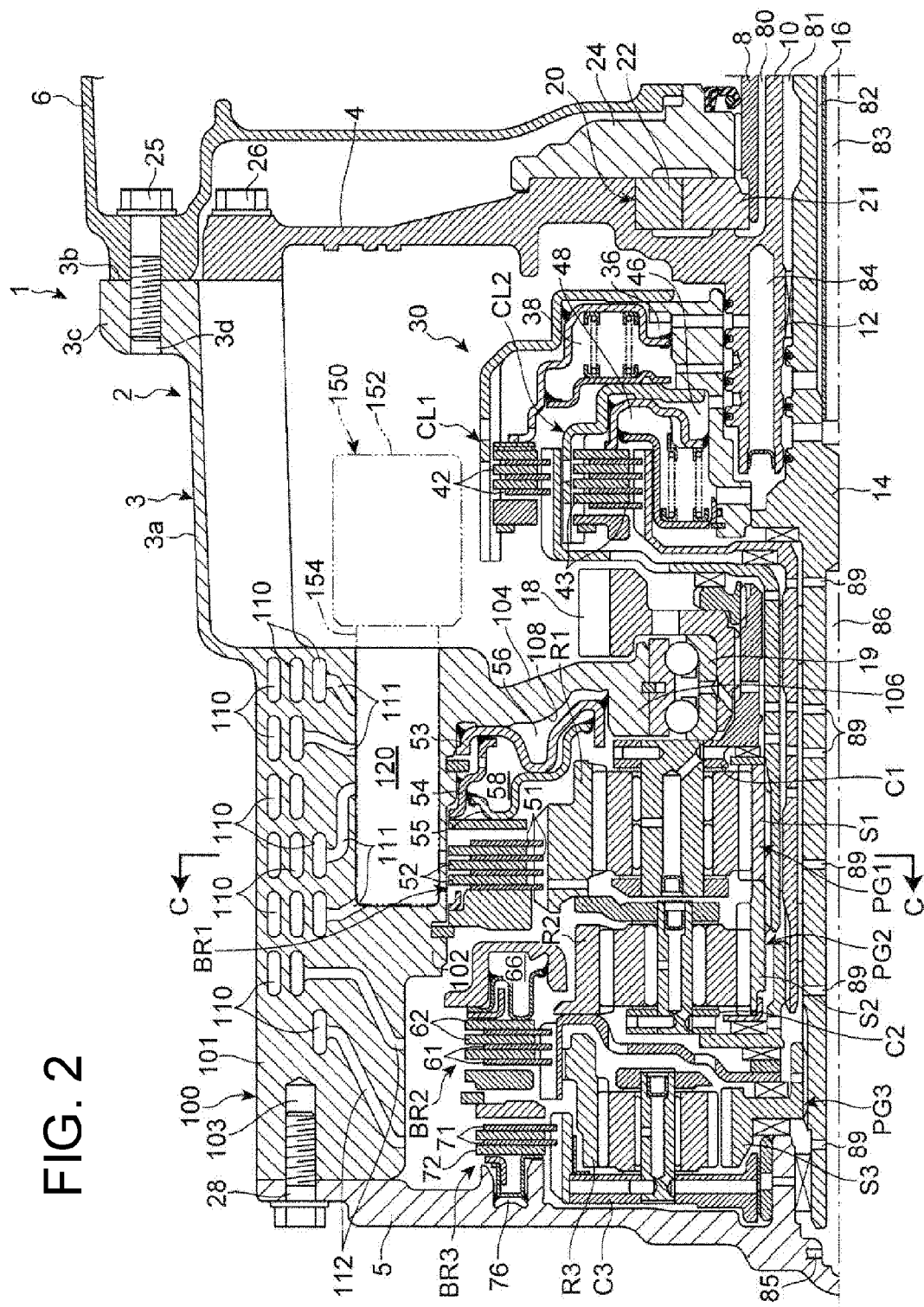
FIG. 2 is a cross-sectional view illustrating an upper half of the internal structure of the automatic transmission, taken along a line A-A of FIG. 1.
Figure 3:
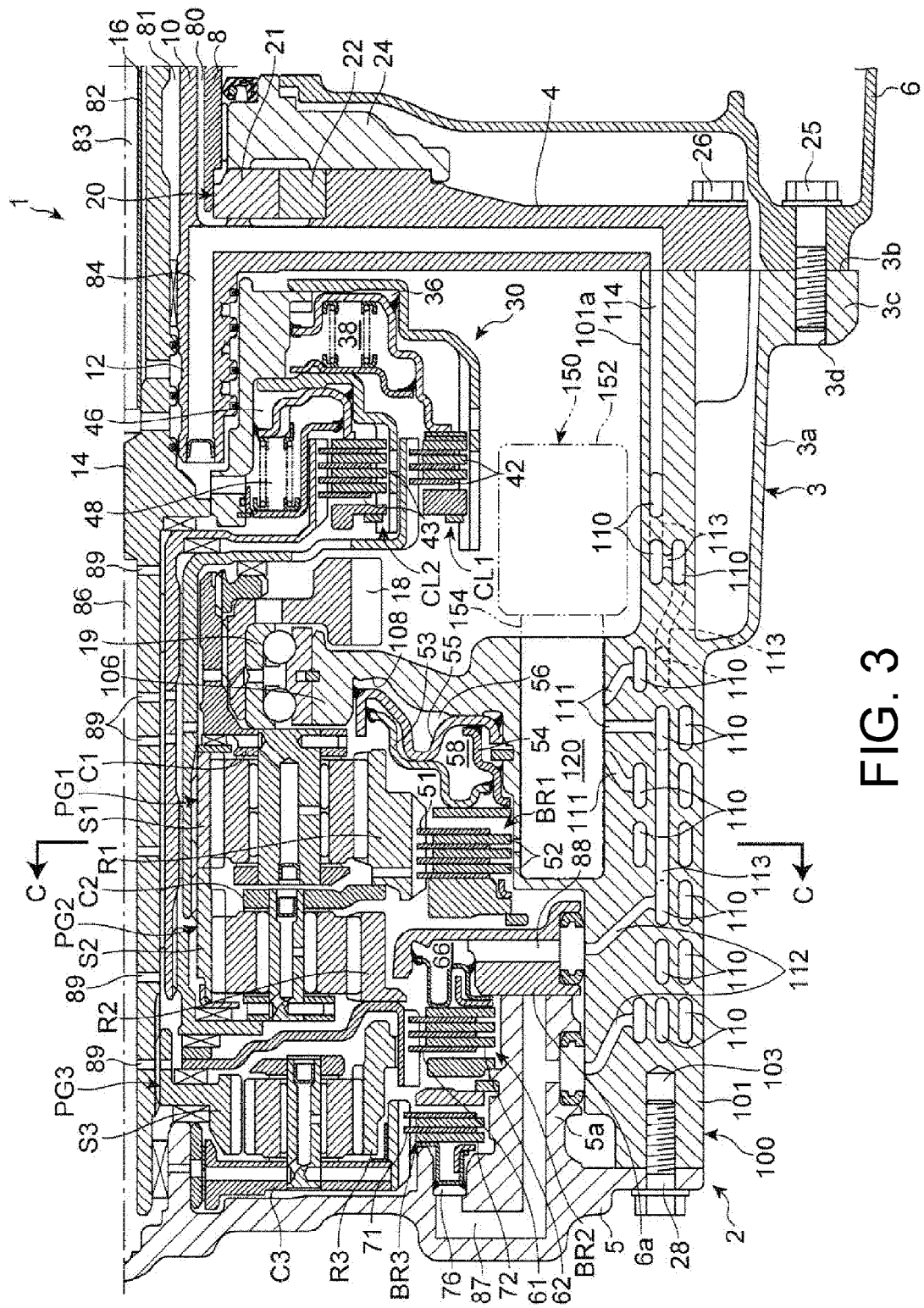
FIG. 3 is a cross-sectional view illustrating a lower half of the internal structure of the automatic transmission, taken along the line A-A of FIG. 1.
Figure 4:
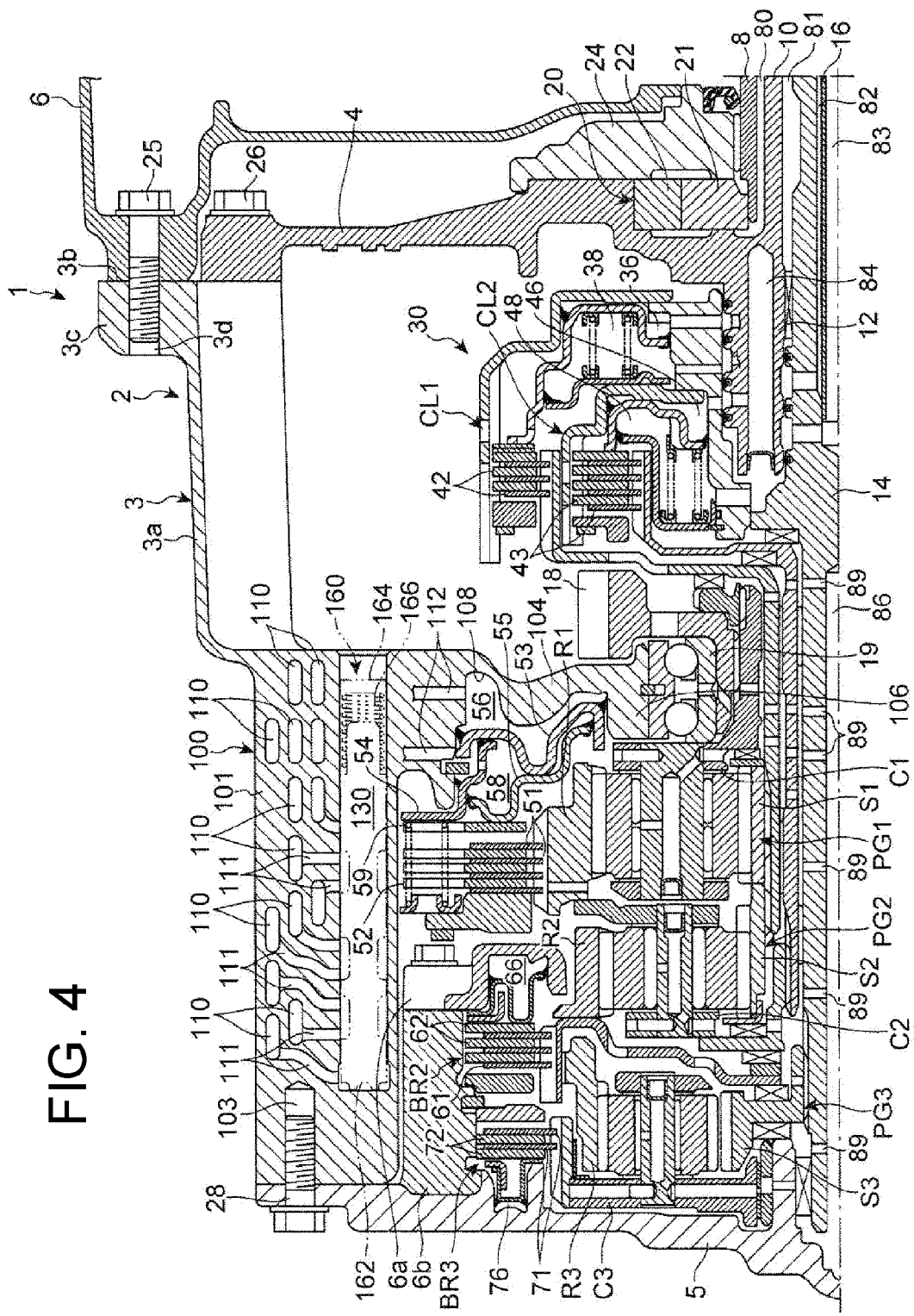
FIG. 4 is a cross-sectional view illustrating the upper half of the internal structure of the automatic transmission, taken along a line B-B of FIG. 1.
Figure 5:
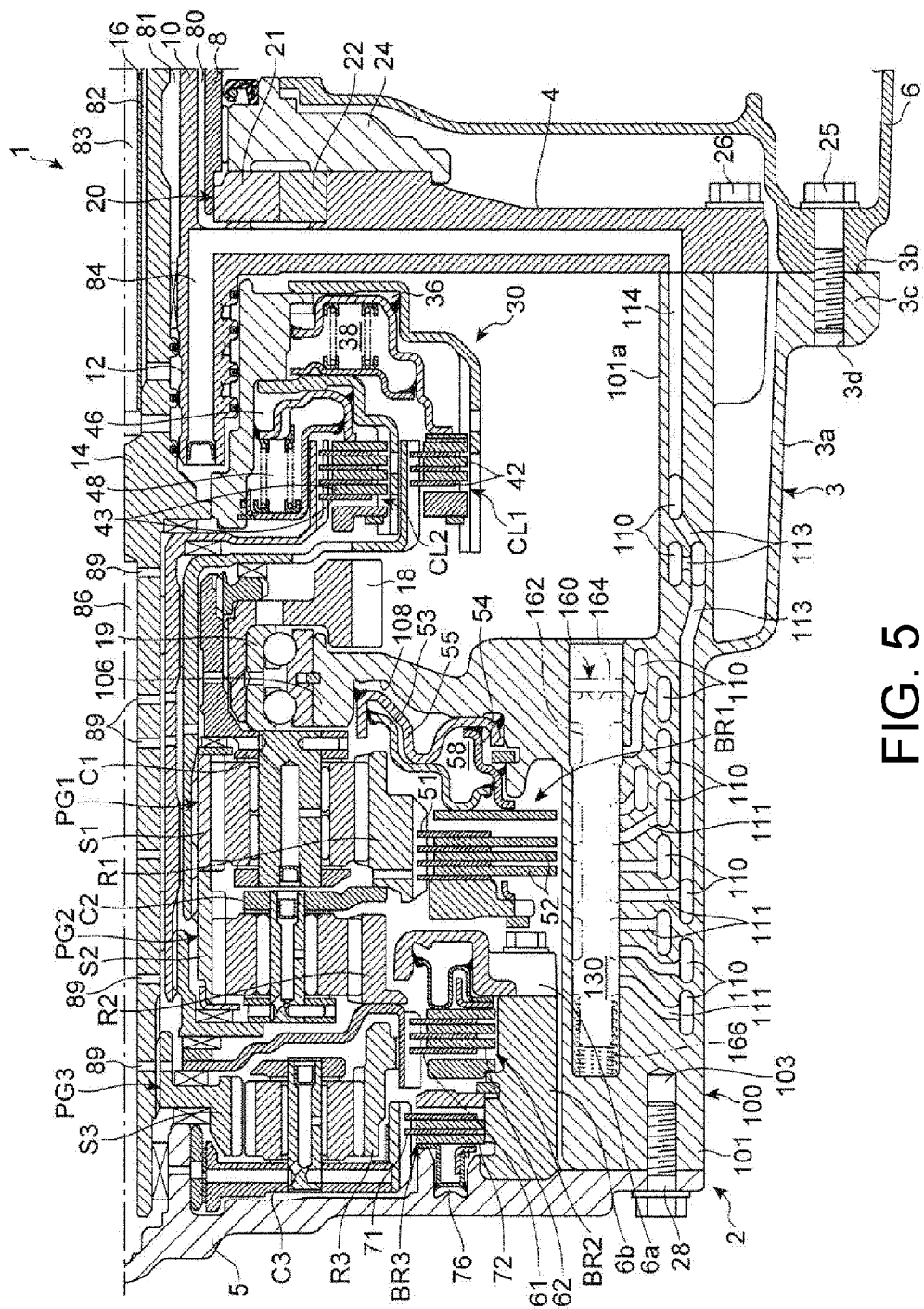
FIG. 5 is a cross-sectional view illustrating the lower half of the internal structure of the automatic transmission, taken along the line B-B of FIG. 1.
Figure 6:
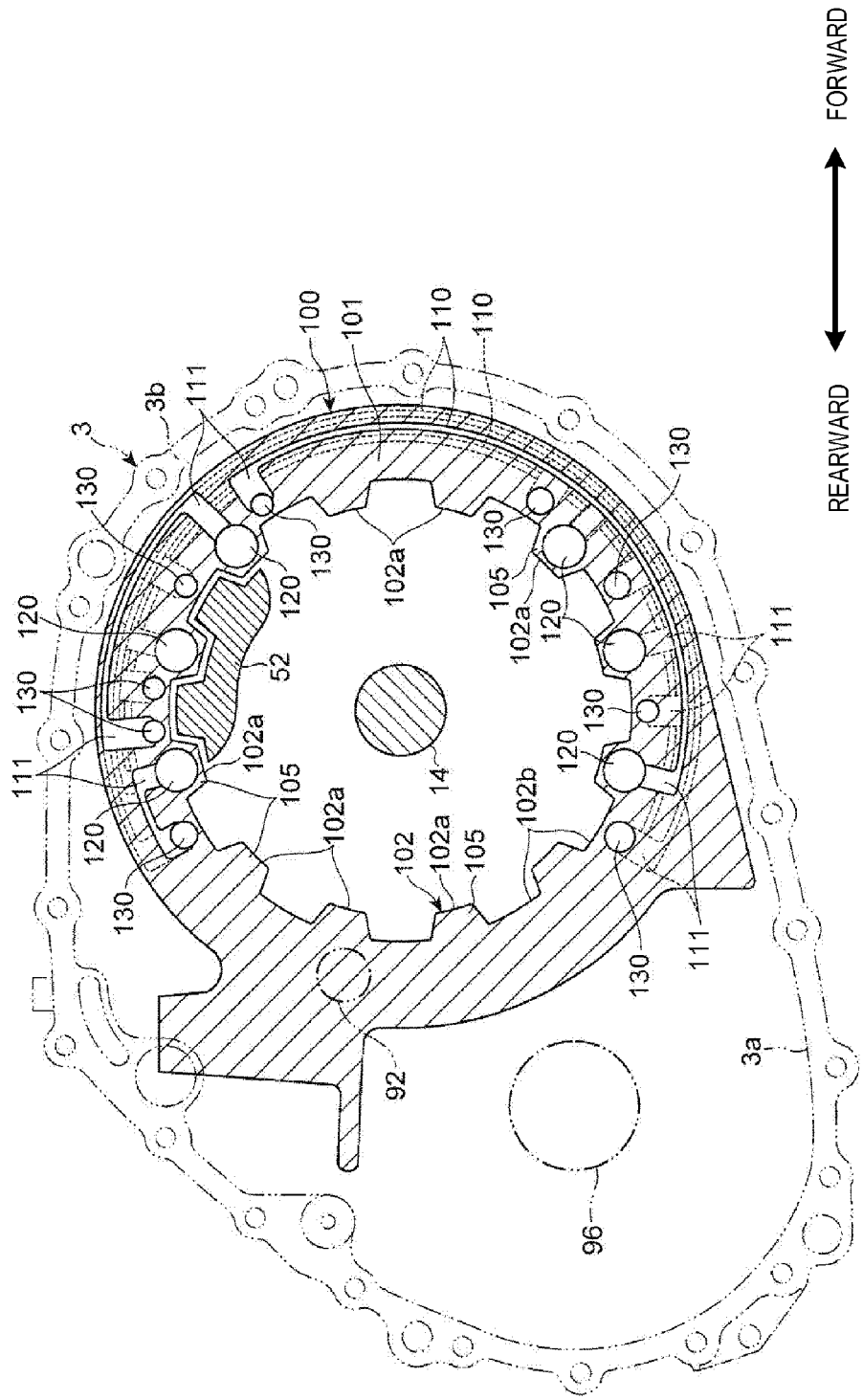
FIG. 6 is a cross-sectional view illustrating a substantial part of the automatic transmission, taken along a line C-C of FIGS. 2 and 3.
Figure 7:
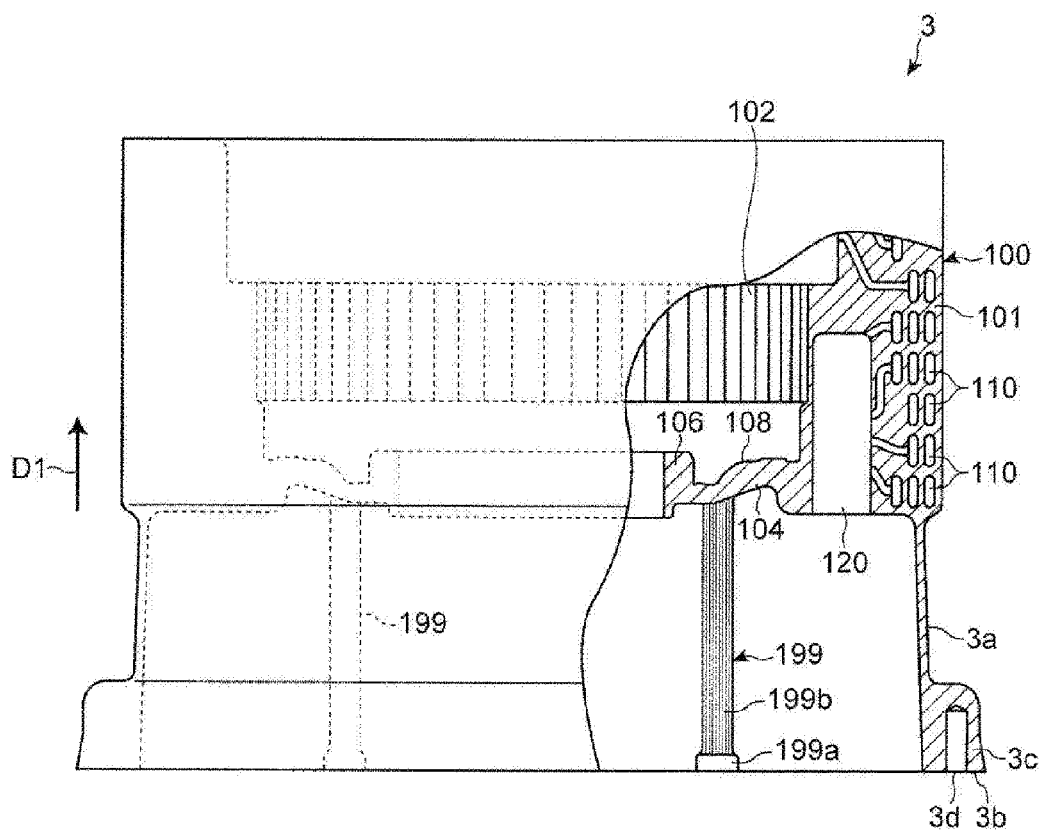
FIG. 7 is a partially-cut side view illustrating a case body of a transmission case and supporting parts formed integrally by a three-dimensional additive manufacturing method.

FIG. 1 is a schematic view of an internal structure of the automatic transmission 1 according to the first embodiment, seen from a drive source side in axial directions. FIGS. 2 and 3 are cross-sectional views illustrating the internal structure of the automatic transmission 1, taken along a line A-A of FIG. 1. FIGS. 4 and 5 are cross-sectional views illustrating the internal structure of the automatic transmission 1, taken along a line B-B of FIG. 1. FIG. 6 is a cross-sectional view illustrating a substantial part of the automatic transmission 1, taken along a line C-C of FIGS. 2 and 3. FIG. 7 is a partially-cut side view illustrating a case body of a transmission case and supporting parts formed integrally by a three-dimensional additive manufacturing method.

Note that, in FIGS. 1 to 6, illustration of a transmission mechanism 30 is omitted for easier understanding of the present invention.

Overall Structure of Automatic Transmission

As illustrated in FIGS. 1 to 5, the automatic transmission 1 includes the transmission mechanism 30 and the transmission case 2 accommodating the transmission mechanism 30.

The automatic transmission 1 is to be applied to an automobile with a transverse engine (vehicle), such as a vehicle with a front-engine, front-wheel-drive layout. The transmission mechanism 30 is disposed on an axis extending in a width direction of the vehicle.

Note that, although it is not illustrated, a torque converter and a drive source (e.g., engine) are disposed, for example, on a right side of the transmission mechanism 30 in the vehicle width direction. Hereinafter, for the sake of convenience, in the width direction of the vehicle (the axial directions of the transmission mechanism 30), the drive source side (right side in FIGS. 2 to 5) is referred to as the front side and a side opposite from the drive source (left side in FIGS. 2 to 5) is referred to as the rear side.

As illustrated in FIGS. 2 to 5, the transmission mechanism 30 includes an input shaft 14 extending along the axis and a counter drive gear 18 (an output part of the transmission mechanism) disposed on the same axis.

The input shaft 14 of the transmission mechanism 30 is, for example, integrally formed with a turbine shaft (an output part of the torque converter) and coupled to the drive source via the torque converter. Thus, the transmission mechanism 30 receives via the input shaft 14 an output rotation of the torque converter.

A center axis part of the input shaft 14 is formed with a front-side oil hole 83 extending from a front-side end surface of the input shaft 14 to the rear side in the axial directions, and a rear-side oil hole 86 extending from a rear-side end surface of the input shaft 14 to the front side in the axial directions. Further, the input shaft 14 is formed with a plurality of oil holes 89 at a predetermined interval in the axial directions, and each oil hole 89 extends in radial directions of the input shaft 14 so as to communicate the rear-side oil hole 86 with a space outside the input shaft 14.

As illustrated in FIG. 1, the automatic transmission 1 further includes a counter shaft 92 provided with a counter driven gear 93 meshing with the counter drive gear 18. The counter shaft 92 is disposed on a vehicle rear side of the input shaft 14 to be in parallel to the input shaft 14. The counter shaft 92 is further provided with a final drive gear 94 having a smaller diameter than the counter driven gear 93.

Left and right axles 96 are disposed at a position obliquely downward and on the vehicle rear side of the counter shaft 92, and the axles 96 are meshed with a differential ring gear 95 of a differential (not illustrated) disposed on the same axis as the axles 96. The differential ring gear 95 has a larger diameter than the final drive gear 94, and thus, an output rotation of the transmission mechanism 30 is decelerated and transmitted to the differential, and a drive force inputted into the differential is transmitted to the left and right axles 96 so as to have a rotational difference therebetween according to a travelling status.

Transmission Mechanism

As illustrated in FIGS. 2 to 5, the automatic transmission 1 is a stepped transmission, for example. The transmission mechanism 30 includes a plurality of planetary gear sets (hereinafter, simply referred to as the "gear sets") PG1, PG2 and PG3, a plurality of clutches CL1 and CL2, and a plurality of brakes BR1, BR2 and BR3.

Specifically, the plurality of gear sets include first to third gear sets PG1 to PG3, the plurality of clutches include first and second clutches CL1 and CL2, and the plurality of brakes include first to third brakes BR1 to BR3, for example.

The first to third gear sets PG1 to PG3 are disposed on the axis of the input shaft 14 in this order from the front side, and constitute a drive force transmission path between the input shaft 14 and the counter drive gear 18. These gear sets PG1 to PG3 are disposed on the rear side of the counter drive gear 18.

Each of the first to third gear sets PG1 to PG3 has three rotational elements. As these rotational elements, the first gear set PG1 has a first sun gear S1, a first ring gear R1, and a first carrier C1, the second gear set PG2 has a second sun gear S2, a second ring gear R2, and a second carrier C2, and the third gear set PG3 has a third sun gear S3, a third ring gear R3, and a third carrier C3.

Each of the first and second gear sets PG1 and PG2 is a single pinion type. In the single pinion gear set PG1, a pinion supported by the carrier C1 is directly meshed with the sun gear S1 and the ring gear R1. In the single pinion gear set PG2, a pinion supported by the carrier C2 is directly meshed with the sun gear S2 and the ring gear R2.

On the other hand, the third gear set PG3 is a double pinion type and has a first pinion meshed with the third sun gear S3, and a second pinion meshed with the first pinion and the third ring gear R3. These pinions are supported by the third carrier C3.

The first and second clutches CL1 and CL2 are disposed on the front side of the counter drive gear 18, on the axis of the input shaft 14. The first and second clutches CL1 and CL2 overlap with each other in radial directions thereof such that the first clutch CL1 is located radially outward relative to the second clutch CL2.

The first clutch CL1 includes a plurality of friction plates 42 for disconnecting the input shaft 14 from the first and second sun gears S1 and S2, an oil pressure chamber 36 into which oil pressure for engaging the friction plates 42 is applied, and a centrifugal balance chamber 38 into which oil pressure is applied for reducing dragging when releasing from the engaged state.

The second clutch CL2 includes a plurality of friction plates 43 for disconnecting the input shaft 14 from the second carrier C2, an oil pressure chamber 46 into which oil pressure for engaging the friction plates 43 is applied, and a centrifugal balance chamber 48 into which oil pressure is applied for reducing dragging when releasing from the engaged state.

The first to third brakes BR1 to BR3 are disposed on the axis of the input shaft 14 in this order from the front side. These brakes BR1 to BR3 are disposed on the rear side of the counter drive gear 18 in the axial directions and on an outer side of the first to third gear sets PG1 to PG3 in radial directions thereof.

The first brake BR1 disconnects the ring gear R1 and the second carrier C2 from the transmission case 2, and includes inner friction plates 51 spline-fitted to an outer circumference of the first ring gear R1, and outer friction plates 52 spline-fitted to an inner circumference of the transmission case 2.

The first brake BR1 is a tandem piston type brake including a plurality of pistons 53 to 55, and a plurality of oil pressure chambers 56 and 58. After oil pressure is applied into the oil pressure chamber 56 for clearance adjustment and the engaging piston 53 makes contact or substantially makes contact (zero clearance state) with the friction plates 51 and 52 without pushing them, by applying oil pressure to the oil pressure chamber 58 for engagement, the friction plates 51 and 52 are pushed by the engaging piston 53 and, thus, the first brake BR1 is engaged.

The second brake BR2 is a single piston type brake including inner and outer friction plates 61 and 62, and an oil pressure chamber 66 into which engaging oil pressure is applied. The second brake BR2 disconnects the second ring gear R2 and the third ring gear R3 from the transmission case 2.

The third brake BR3 is a single piston type brake including inner and outer friction plates 71 and 72, and an oil pressure chamber 76 into which engaging oil pressure is applied. The third brake BR3 disconnects the third carrier C3 from the transmission case 2.

The application and discharge of the oil pressure to and from the friction engaging elements CL1, CL2, BR1, BR2 and BR3 described above are controlled by a hydraulic controller having solenoid valves 150 and spool valves 160, to selectively engage the friction engaging elements described above. Thus, a gear position corresponding to a gear shift range and an operating state of the vehicle is formed.

Note that, for easier understanding of the present invention, the solenoid valve 150 and the spool valve 160 are indicated by virtual lines in FIGS. 2 to 5 and not illustrated in FIG. 6.

The structure of the transmission mechanism 30 described above is merely an example, and a specific structure of the transmission mechanism 30 is not particularly limited.

Transmission Case

As illustrated in FIGS. 2 to 5, the transmission case 2 has a case body 3 forming an outer circumference thereof, an oil pump housing 4 attached to a front-side end part of the case body 3, and an end cover 5 sealing a rear-side end part of the case body 3.

The case body 3 is entirely formed into a substantially cylindrical shape. The front-side end part of the case body 3 is a front-side circumferential wall 3a surrounding the first and second clutches CL1 and CL2 and the counter drive gear 18. A part of the case body 3 on the rear side of the front-side circumferential wall 3a is a valve body 100 of the hydraulic controller. A structure of the valve body 100 is described later.

A front-side opening end portion of the front-side circumferential wall 3a is provided with a mating surface 3b with a converter housing 6 accommodating the torque converter. The mating surface 3b is formed with seating portions 3c at a predetermined interval in a circumferential direction of the front-side circumferential wall 3a (see FIG. 1). Each seating portion 3c is formed with a bolt hole 3d. Further, a bolt 25 is fitted into the bolt hole 3d to couple the case body 3 to the converter housing 6.

The oil pump housing 4 is disposed to partition a torque converter accommodating space of the converter housing 6, from a transmission mechanism-accommodating space of the case body 3. An outer circumferential end part of the oil pump housing 4 is fixed to the front-side end part of the case body 3 by, for example, bolts 26.

An oil pump cover 37 is attached to a front side of the oil pump housing 4, and an oil pump 20 is accommodated between the oil pump housing 4 and the oil pump cover 37.

The oil pump 20 is, for example, an inscribed mechanical oil pump including an inner rotor 21 and an outer rotor 22. A sleeve part 8 extending to the rear side in the axial directions from an inner circumferential end part of a pump shell (not illustrated) of the torque converter is fixed to an inside of the inner rotor 21, for example, by press fitting. Thus, the oil pump 20 is driven by a rotation of the drive source (e.g., engine) through the sleeve part 8 of the torque converter.

A sleeve part 10 extending to the front side (torque converter side) in the axial directions, and a boss 12 extending to the rear side (transmission mechanism side) in the axial directions are provided in an inner circumferential end part of the oil pump housing 4.

The sleeve part 10 of the oil pump housing 4 is disposed at a position radially outward relative to the input shaft 14 and radially inward relative to the sleeve part 8 of the torque converter. Oil paths 80 and 81 for supplying and discharging oil to and from the torque converter are formed between an outer circumferential surface of the sleeve part 10 and an inner circumferential surface of the sleeve part 8, and between an inner circumferential surface of the sleeve part 10 and an outer circumferential surface of the input shaft 14, respectively.

Note that, the front-side oil hole 83 formed in the input shaft 14 is also used as one of the oil supply path and the oil discharge path to and from the torque converter. Further, a pipe member 16 is fitted into the oil hole 83. Additionally, in the oil hole 83, an oil path 82 for supplying or discharging the oil to and from the torque converter is formed radially outward relative to the pipe member 16.

The input shaft 14 penetrates through the boss 12, and the first and second clutches CL1 and CL2 are disposed radially outward relative to the boss 12. Further, a plurality of oil paths 84 are formed in a circumferential wall of the boss 12 at a predetermined interval in the circumferential direction.

The plurality of oil paths 84, for example, guide the oil discharged from the oil pump 20 to oil paths 110 (described later) of the valve body 100, and apply oil pressure to the oil pressure chambers 36 and 46 and the centrifugal balance chambers 38 and 48 of the first and second clutches CL1 and CL2.

The end cover 5 is coupled to the rear-side end part of the case body 3 by, for example, bolts 28. As illustrated in FIG. 3, the end cover 5 is provided with a protrusion 5a protruding to the front side in the axial directions, and the protrusion 5a is formed with an oil path 87 communicating the oil paths 112 (described later) formed in the valve body 100 with the oil pressure chamber 76 of the third brake BR3.

Further, as illustrated in FIGS. 4 and 5, on the front side of the end cover 5, a first attaching member 6a forming the oil pressure chamber 66 of the second brake BR2 is coupled to a second attaching member 6b to which outer circumferential parts of the outer friction plates 62 and 72 of the second and third brakes BR2 and BR3 are spline fitted. As illustrated in FIG. 3, the second attaching member 6b is formed with an oil path 88 communicating the oil paths 112 (described later) of the valve body 100 with the oil pressure chamber 66.

Moreover, as illustrated in FIG. 2, the end cover 5 is formed with an oil path 85 communicating the oil paths 110 (described later) formed in the valve body 100 with the rear-side oil hole 86 of the input shaft 14. The oil supplied into the oil hole 86 of the input shaft 14 from the oil path 85 receives a centrifugal force caused by a rotation of the input shaft 14, passes through the oil holes 89 which communicates the oil hole 86 with the outside of the input shaft 14, and is supplied to various parts of the transmission mechanism 30 disposed radially outward relative to the input shaft 14. Thus, the meshed portions, bearings, for example, of the gears of the transmission mechanism 30 are lubricated.

Valve Body

The valve body 100 of the hydraulic controller of this embodiment is different from the conventional valve body attached to the outside of the transmission case, and is formed integrally with the case body 3 of the transmission case 2 by a three-dimensional additive manufacturing method.

As illustrated in FIGS. 2 to 6, the valve body 100 includes a cylindrical part 101 extending along the axis of the transmission mechanism 30, and the cylindrical part 101 is arranged to surround the first to third gear sets PG1 to PG3 and the first to third brakes BR1 to BR3 of the transmission mechanism 30.

The cylindrical part 101 of the valve body 100 continues to a rear-side end portion of the front-side circumferential wall 3a of the case body 3 as an integral body, and has a smaller outer diameter than that of the front-side circumferential wall 3a.

A rear-side end surface of the cylindrical part 101 is formed with a plurality of bolt holes 103 at a predetermined interval in the circumferential direction, and by fitting the bolts 28 into the bolt holes 103, the end cover 5 is fixed to the cylindrical part 101.

The valve body 100 further includes an annular-shaped vertical wall part 104 extending radially inward from a front-side end portion of the cylindrical part 101, and an inner cylindrical part 106 extending in the axial directions, from an inner circumferential end portion of the vertical wall part 104 to the rear side. The cylindrical part 101, the vertical wall part 104, and the inner cylindrical part 106 of the valve body 100 form a cylinder 108 which is a substantially circumferential groove opening to the rear side in the axial directions, and the cylinder 108 accommodates the pistons 53, 54 and 55 of the first brake BR1. Further, a bearing 19 for supporting the counter drive gear 18 is fitted into a radially inward side of the inner cylindrical part 106.

Since the vertical wall part 104 and the inner cylindrical part 106 forming the cylinder 108 of the first brake BR1 and having the function to support the bearing 19 are integrated with the valve body 100, the components can be reduced in number and a size and weight of the entire automatic transmission 1 can also be reduced.

A spline 102 to which outer circumferential parts of the outer friction plates 52 of the first brake BR1 are fitted is formed in an inner circumference of the cylindrical part 101. As illustrated in FIG. 6, the spline 102 includes a plurality of teeth 102a provided at a predetermined interval in a circumferential direction of the cylindrical part 101, and tooth grooves 102b, each formed between adjacent teeth 102a. Since the spline 102 is formed as above, a plurality of inward protrusions 105 forming the teeth 102a, respectively, are formed at a predetermined interval in the circumferential direction, and each protrusion 105 protrudes inward in a radial direction of the cylindrical part 101 than a bottom portion of the tooth groove 102b.

The cylindrical part 101 of the valve body 100 is formed with solenoid valve insertion holes 120 to which the solenoid valves 150 are attached, respectively, spool valve insertion holes 130 to which the spool valves 160 are attached, respectively, and the oil paths 110 communicating with these valve insertion holes 120 and 130.

The solenoid valves 150 and the spool valves 160 constitute a hydraulic control circuit (not illustrated) along with the oil paths 110 of the valve body 100. By operations of the solenoid valves 150 and the spool valves 160, the hydraulic control circuit controls supply and discharge of oil to and from the oil pressure chambers 36, 46, 56, 58, 66 and 76, and the centrifugal balance chambers 38 and 48 of the clutches CL1 and CL2 and the brakes BR1, BR2 and BR3 which constitute the transmission mechanism 30, lubricated parts inside the transmission case 2 (the meshed portions, the bearings, for example, of the gears of the transmission mechanism 30), lubricated parts of the torque converter, an oil pressure chamber of a lockup clutch (not illustrated), for example.

As illustrated in FIGS. 4 and 5, each spool valve 160 includes a spool 162 accommodated inside the valve insertion hole 130 to be movable in the axial directions, a stopper 164 fixed at a predetermined position inside the valve insertion hole 130, and a return spring 166 attached inside the valve insertion hole 130 to be extendable and contractible in the axial directions and for applying an elastic force to the spool 162 in one of the axial directions.

The spool valve 160 adjusts a discharge pressure and switches an oil pressure transmission path, by moving the spool 162 in the axial directions responsive to oil pressure applied into a control port of the spool valve 160. Specifically, the spool valves 160 may function as various switch valves, such as a pressure regulator valve for adjusting a discharge pressure of the mechanical oil pump to a line pressure, a manual valve for switching the oil pressure transmission path in conjunction with an operation of a gear shift lever performed by a driver of the vehicle, and a failsafe valve for switching the oil pressure transmission path to achieve a predetermined gear position when the solenoid valves 150 fail.

As illustrated in FIGS. 2 and 3, each solenoid valve 150 includes an electromagnetic part 152 formed into a circular cylindrical shape and accommodating a coil, and a small-diameter part 154 formed into a circular cylindrical shape, extending in the axial directions from the electromagnetic part 152, and having a smaller diameter than the electromagnetic part 152. The solenoid valve 150 is attached to the valve body 100 in a state where the small-diameter part 154 is inserted into the valve insertion hole 120.

The solenoid valve 150 is disposed to project to the front side from the cylindrical part 101 of the valve body 100. The electromagnetic part 152 of the solenoid valve 150 is disposed on the front side of the cylindrical part 101 and accommodated in an internal space of the front-side circumferential wall 3a, which has a larger diameter than the cylindrical part 101. In the front-side circumferential wall 3a, the electromagnetic part 152 is disposed radially outward relative to the counter drive gear 18 and the first and second clutches CL1 and CL2 without interfering with them.

As the solenoid valve 150, one of a linear solenoid and an on-off solenoid valve is used. The linear solenoid valve is, for example, used as a valve for directly controlling oil pressure to the oil pressure chambers 36, 46, 56, 58, 66 and 76 of the friction engaging elements CL1, CL2, BR1, BR2 and BR3. The on-off solenoid valve is, for example, used as a valve for opening and closing the oil pressure transmission path to the control port of the spool valve 160.

The valve insertion holes 120 and 130 to which the solenoid valves 150 and the spool valves 160 are attached, respectively, are formed when shaping the valve body 100 by the three-dimensional additive manufacturing method, and then a finishing process is performed on inner circumferential surfaces of the valve insertion holes 120 and 130. Although specific structures of the valve insertion holes 120 and 130, such as orientations and arrangements thereof, are arbitrary, in this embodiment, the valve insertion holes 120 and 130 are formed as follows.

As illustrated in FIGS. 2 to 6, axial directions of all the valve insertion holes 120 and 130 are parallel to the axial directions of the transmission mechanism 30. Further, all the valve insertion holes 120 and 130 open to the front side in their axial directions, respectively. Thus, when finish-processing the inner circumferential surfaces of the valve insertion holes 120 and 130, all the valve insertion holes 120 and 130 can be processed from the same direction, and when attaching the valves 150 and 160 to the valve insertion holes 120 and 130, all the valves 150 and 160 can be inserted from the same direction.

As illustrated in FIG. 6, the valve insertion holes 120 and 130 are disposed at predetermined intervals in the circumferential direction of the cylindrical part 101, along the inner circumference of the cylindrical part 101 of the valve body 100. Since the small-diameter part 154 of the solenoid valve 150 has a larger diameter than the spool 162 of the spool valve 160, each solenoid valve insertion hole 120 has a larger diameter than each spool valve insertion hole 130.

The solenoid valve insertion hole 120 having the comparatively large diameter is disposed at a position corresponding to one of the teeth 102a of the spline 102 in the circumferential direction, such that a radially inward part of the solenoid valve insertion hole 120 is contained in the protrusion 105. The valve insertion hole 120 formed as above by using the protrusion 105 which is a thicker portion compared to a position corresponding to the tooth groove 102b of the spline 102 in the circumferential direction, is disposed close to a radially inward end of the cylindrical part 101 so as to be located near a tip portion of the tooth 102a.

On the other hand, each spool valve insertion hole 130 having the comparatively small diameter is disposed close to the radially inward end so as to be located near the bottom portion of the tooth groove 102b, at a position corresponding to one of the tooth grooves 102b of the spline 102 in the circumferential direction.

By disposing all the valve insertion holes 120 and 130 close to the radially inward end as above, the cylindrical part 101 of the valve body 100 can be structured compactly in the radial directions thereof. Thus, the valve body 100 can be reduced in size, which results in a size reduction of the transmission case 2.

Moreover, by forming the solenoid valve insertion holes 120 at the positions corresponding to the teeth 102a of the spline 102, and forming the spool valve insertion holes 130 at the positions corresponding to the tooth grooves 102b, these insertion holes 120 and 130 can be disposed adjacent to each other in the circumferential direction of the cylindrical part 101. Therefore, each spool valve 160 which is operated by a control pressure applied by a predetermined solenoid valve 150 is disposed near the solenoid valve 150. Thus, the oil path 110 communicating these valves 150 and 160 is shortened, and as a result, high responsiveness can be obtained in an oil pressure control.

Note that in this embodiment, all the spool valve insertion holes 130 are formed at the positions corresponding to the tooth grooves 102b of the spline 102 in the circumferential direction; however, one or more of the spool valve insertion holes 130 may be provided at positions corresponding to the teeth 102a of the spline 102 in the circumferential direction. In this case, the one or more of the valve insertion holes 130 is disposed further radially inward, and thus, the cylindrical part 101 of the valve body 100 can be reduced further in size.

In this embodiment, the valve insertion holes 120 and 130 are disposed to concentrate in an upper part and a lower part of the cylindrical part 101 of the valve body 100. Since the spool valves 160 attached to the valve insertion holes 130 disposed in the lower part of the cylindrical part 101 are either soaked in oil stored in a bottom part of the transmission case 2 or located near a surface of the oil, the spool valves 160 attached to the valve insertion holes 130 are preferably spool valves 160 with a large drain amount, such as the pressure regulator valve for example, On the other hand, the spool valves 160 which supply lubricating oil to the lubricated parts inside the transmission case 2 are preferably attached to the valve insertion holes 130 disposed in the upper part of the cylindrical part 101.

Since the oil paths 110 communicating with the valve insertion holes 120 and 130 are formed by shaping the valve body 100 with the three-dimensional additive manufacturing method, compared to the conventional structure in which the oil paths are formed by molding, a high degree of freedom can be obtained for specific structures of the oil paths 110, such as the orientations, arrangements, cross-sectional shapes, and number thereof, and in this embodiment, the oil paths 110 are formed as follows.

As illustrated in FIG. 6, most of the oil paths 110 formed in the cylindrical part 101 of the valve body 100 extend in the circumferential direction. These oil paths 110 are disposed radially outward relative to the valve insertion holes 120 and 130 and have a shape extending in an arc shape centering on the axis of the input shaft 14. Each oil path 110 has a predetermined length in the circumferential direction and, depending on the position in the axial directions and the radial directions, two or more of the oil paths 110 overlap in the circumferential direction.

Note that, each oil path 110 is not necessarily located at a fixed position in the axial directions and the radial directions, and it may alternatively curve or bend in the circumferential direction.

The range where the oil paths 110 are formed in the circumferential direction has, for example, a C-shape opening to the vehicle rear side, and all the oil paths 110 are disposed on a vehicle front side of the counter shaft 92. Thus, interference of a bearing and other neighboring components of the counter shaft 92 with the oil paths 110 is avoided.

As illustrated in FIGS. 2 to 5, the oil paths 110 extending in the cylindrical part 101 in the circumferential direction are disposed so that two or more of the oil paths 110 overlap in the axial directions and the radial directions. Further, as illustrated in FIGS. 3 and 5, a part of the cylindrical part 101 in the circumferential direction is provided with an extension part 101a extending to the front side in the axial directions and coupled to the oil pump housing 4, and the extension part 101a is also formed with oil paths 110 extending in the circumferential direction.

A cross-sectional shape of each oil path 110 extending in the circumferential direction is, for example, an oval shape which is long in the axial directions, and thus, the oil path 110 is formed compactly in the radial directions. Therefore, the cylindrical part 101 is reduced in size.

Moreover, the cylindrical part 101 is formed with communication oil paths 111 communicating the oil paths 110 extending in the circumferential direction with the valve insertion holes 120 and 130, the communication oil paths 112 communicating the oil paths 110 extending in the circumferential direction with an inner circumferential side of the valve body 100, communication oil paths 113 communicating the oil paths 110 extending in the circumferential direction with each other, and communication oil paths 114 (see FIGS. 3 and 5) communicating the oil paths 110 extending in the circumferential direction with the oil paths 84 formed in the oil pump housing 4.

Thus, for example, oil discharged from a predetermined one of the solenoid and spool valves 150 and 160 is first introduced into a corresponding oil path 110 through a corresponding communication oil path 111, then introduced into other oil paths 110 through the communication oil paths 113 as needed, and finally supplied through the communication oil paths 112 into any one of the oil pressure chambers 56, 58, 66 and 76 of the brakes BR1, BR2 and BR3 or the lubricated parts inside the transmission case 2, and/or the oil pressure chambers 36 and 46 of the clutches CL1 and CL2 through the communication oil paths 114 and the oil paths 84 of the oil pump housing 4 (see FIGS. 3 and 5).

As described above, the cylindrical part 101 of the valve body 100 formed with the valve insertion holes 120 and 130 and the oil paths 110 is thicker than the front-side circumferential wall 3a. Therefore, gear noise which is caused by the gear sets PG1 to PG3, for example, inside the cylindrical part 101 is effectively blocked by the thick cylindrical part 101. Moreover, since the part of the cylindrical part 101 on the radially outward side of the solenoid valves 150 also has a thickness enough to dispose the oil paths 110, operating noise of the solenoid valves 150 is effectively blocked by the cylindrical part 101 as well.

Note that, the valve body 100 may further be provided integrally with other components constituting the hydraulic control circuit, such as a check valve and an orifice. Further, in a case where the check valve, the orifice, for example, are formed as separate components from the valve body 100, insertion ports for attaching the separate components may be formed in the valve body 100.

Manufacturing Method of Case Body

The case body 3 of the transmission case 2, which includes the valve body 100 and the front-side circumferential wall 3a, is formed by the three-dimensional additive manufacturing method using a 3D printer, so that the entire case body 3 becomes integrally continuous except for the hollow parts, such as the valve insertion holes 120 and 130 and the oil paths 110, 111, 112, 113 and 114. Thus, the case body 3 integrated with the valve body 100 is formed.

Although a specific printing method in the three-dimensional additive manufacturing method is not particularly limited, in a case of using metal (e.g., aluminum) for a material of the case body 3, for example, a selective laser sintering method may be adopted, in which operation of irradiating any position of a layer paved with metallic powder with one of an electron beam and a laser to sinter and shape the irradiated part, and then paving the next layer is repeated.

Further, in a case of using plastic for a material of the case body 3, although the selective laser sintering method may be adopted, a larger number of kinds of printing method compared to the case of using the metal material are adoptable, and a printing method which satisfies a need, such as an inkjet method, may be adopted. Note that, in the case of forming the case body 3 with plastic, the entire case body 3 may be covered by a cylindrical member made of metal so as to increase stiffness of the transmission case 2.

As illustrated in FIG. 7, in the formation of the case body 3 by the three-dimensional additive manufacturing method, a laminating direction D1 is oriented upward, and the case body 3 is formed in such an orientation that the axes of the valve insertion holes 120 and 130 and the axis of the cylindrical part 101 of the valve body 100, which is to be matched with the axis of the transmission mechanism 30, extend in up-and-down directions of the lamination (corresponding to the laminating direction D1). Further, the case body 3 is formed such that the valve body 100 is located above the front-side circumferential wall 3a.

To stably shape the case body 3, especially the valve body 100, supporting parts 199 for supporting from below a part to be shaped into the valve body 100 during the shaping process, are preferably formed integrally with the case body 3 to extend upward from a lower end in the laminating direction D1. Each supporting part 199 includes, for example, a flat circular column portion 199a formed at the lower end in the laminating direction D1, and a long cylindrical portion 199b extending upward from the circular column portion 199a. The supporting part 199 is provided, for example, at a position for supporting the vertical wall part 104 of the valve body 100.

Since the supporting parts 199 are integrally shaped with the case body 3 as above, the shaping of the valve body 100 on the supporting parts 199 can be stably performed with structural support from below by the supporting parts 199. Therefore, the valve body 100 can be formed at high quality.

Moreover, since the valve insertion holes 120 and 130 are formed along their axes which are parallel to the laminating direction D1 of the three-dimensional additive manufacturing method, the valve body 100 is stably formed without deforming the inner circumferences of the valve insertion holes 120 and 130. Thus, the valve insertion holes 120 and 130 can be formed at high quality. Therefore, a smooth movement of the spools 162 in the spool valve insertion holes 130 can particularly be achieved, which results in achieving an oil pressure control with high responsiveness.

After the shaping process of the case body 3 by the three-dimensional additive manufacturing method is finished, the supporting parts 199 are removed. Since the cylindrical portions 199b of the supporting parts 199 are hollow inside and have low stiffness, the supporting parts 199 can be easily removed.

Then, a finishing process is performed on the inner circumferential surfaces and end surfaces of the valve insertion holes 120 and 130, parts connected with the supporting parts 199, for example, and a thread cutting process is performed on the bolt holes 3d and 103 formed on both end surfaces of the case body 3. Thus, the case body 3 is completed.

Note that the supporting parts 199 are not essential, and particularly in a case of shaping by using a plastic material, depending on the adopted printing method (e.g., selective laser sintering method), the supporting parts 199 may be omitted.

Since the valve body 100 is formed integrally with the case body 3 by the three-dimensional additive manufacturing method and a part of the case body 3 is used also as the valve body 100 as described above, compared to the case where the transmission case and the valve body are individually formed as separate bodies, the material for forming these components can be reduced. Therefore, the size and weight of the entire automatic transmission 1 can be reduced. As a result, the vehicle mountability of the automatic transmission 1 and the fuel performance of the vehicle can be improved.

Moreover, since demolding does not need to be considered in forming the valve body 100, in designing the oil paths 110, 111, 112, 113 and 114 of the valve body 100, without the conventional restriction that all the oil paths need to open to the surface over the entire length thereof, a high degree of freedom can be obtained for the shapes and layouts of the oil paths. Therefore, even when the cylindrical part 101 as described above is formed in the valve body 100, the oil paths 110 can be formed extending in the circumferential direction to follow the shape of the cylindrical part 101.

Therefore, the valve body 100 can be formed into a cylindrical shape as a whole while forming in the valve body 100 the oil paths 110, 111, 112, 113 and 114 required for the oil pressure control. Additionally, since the cylindrical part 101 of the valve body 100 has a smaller diameter than the front-side circumferential wall 3a of the case body 3, the valve body 100 can be prevented from projecting radially outward from the transmission case 2. Therefore, the vehicle mountability of the automatic transmission 1 can effectively be improved compared to the conventional automatic transmission in which the valve body is attached to the outside of the transmission case.

Moreover, the valve body 100 is structured by the single member and further integrated with the transmission case 2. Therefore, compared to the conventional structure in which the valve body is formed by stacking the plurality of valve body structuring members and fastening them with a large number of bolts to be attached to the transmission case, the number of members constituting the valve body and the transmission case can be reduced and the separating plates interposed between the valve body structuring members, the bolts for fastening the valve body structuring members to each other, and the bolts for fixing the valve body to the transmission case, which are used in the conventional structure, can be omitted. Thus, the number of components and assembling processes can effectively be reduced.

Furthermore, as described above, since the valve body 100 is structured by a single member, the bolts for fastening the valve body structuring members to each other and bolts for fixing the valve body to the transmission case can be omitted, and the bolt holes and the bosses can also be reduced in the valve body 100 due to the omission of the bolts. Thus, further reductions in the size and weight of the valve body 100 can be achieved. As a result, the reductions in the size and weight of the automatic transmission 1 can be achieved more effectively.

Additionally, by structuring the valve body 100 so that the oil stored in the transmission case 2 is introduced into the oil paths 110 of the valve body 100 from the inner circumferential side thereof, the oil pan which is commonly attached below the transmission case can be omitted. Thus, the vehicle mountability of the automatic transmission 1 in up-and-down directions of the vehicle can further be improved. Therefore, in this case, a powertrain having the automatic transmission 1 can be disposed at a low position in a vehicle body as a whole. As a result, a vehicle body design in which a height of a hood is low can be achieved.

Moreover, since a high degree of freedom can be obtained in designing the oil paths 110, 111, 112, 113 and 114 of the valve body 100 as described above, layouts of the oil paths such as one in which three of more of the oil paths 110 overlap with each other in the thickness direction of the valve body 100, which could not be achieved by the conventional molding method, becomes possible. Additionally, since the mold does not need to be remade when the design of the oil paths is changed, the design change of the oil paths can easily be achieved in a short period of time.

Further, since the valve body 100 is formed by the three-dimensional additive manufacturing method, hollow parts other than the valve insertion holes 120 and 130 and the oil paths 110, 111, 112, 113 and 114 may be formed at various positions in the valve body 100, and thus, the weight of the valve body 100, and consequently the weight of the automatic transmission 1, can be further reduced.

Moreover, since the shaping process of the three-dimensional additive manufacturing method is performed in the laminating direction D1 along the axis of the cylindrical part 101 of the valve body 100, the valve body 100 can be stably formed without deforming the inner circumference of the cylindrical part 101. Additionally, since the valve insertion holes 120 and 130 are also formed to extend in the laminating direction D1 of the three-dimensional additive manufacturing method in this shaping process, the valve body 100 can be stably formed without deforming the inner circumferences of the valve insertion holes 120 and 130. Therefore, the entire valve body 100, including the valve insertion holes 120 and 130, can be formed at high quality. Especially since a high dimensional precision can be obtained for the spool valve insertion holes 130, the smooth movement of the spools 162 in the spool valve insertion holes 130 can be achieved.

Furthermore, according to this embodiment, since the valve body 100 is integrated with the transmission case 2, in contrast to the conventional structure in which the valve body is provided as a separate body from the transmission case, the oil paths 110 of the valve body 100 are formed in the transmission case 2. Therefore, an oil leak from communicating parts between the oil paths of the valve body and the oil paths of the transmission case does not occur. Thus, a sealing member and the fastening bolts for securing a sealing ability of the communicating parts can be omitted, which also leads to reducing the number of components and the size and weight of the automatic transmission 1.

Second Embodiment

Figure 8:
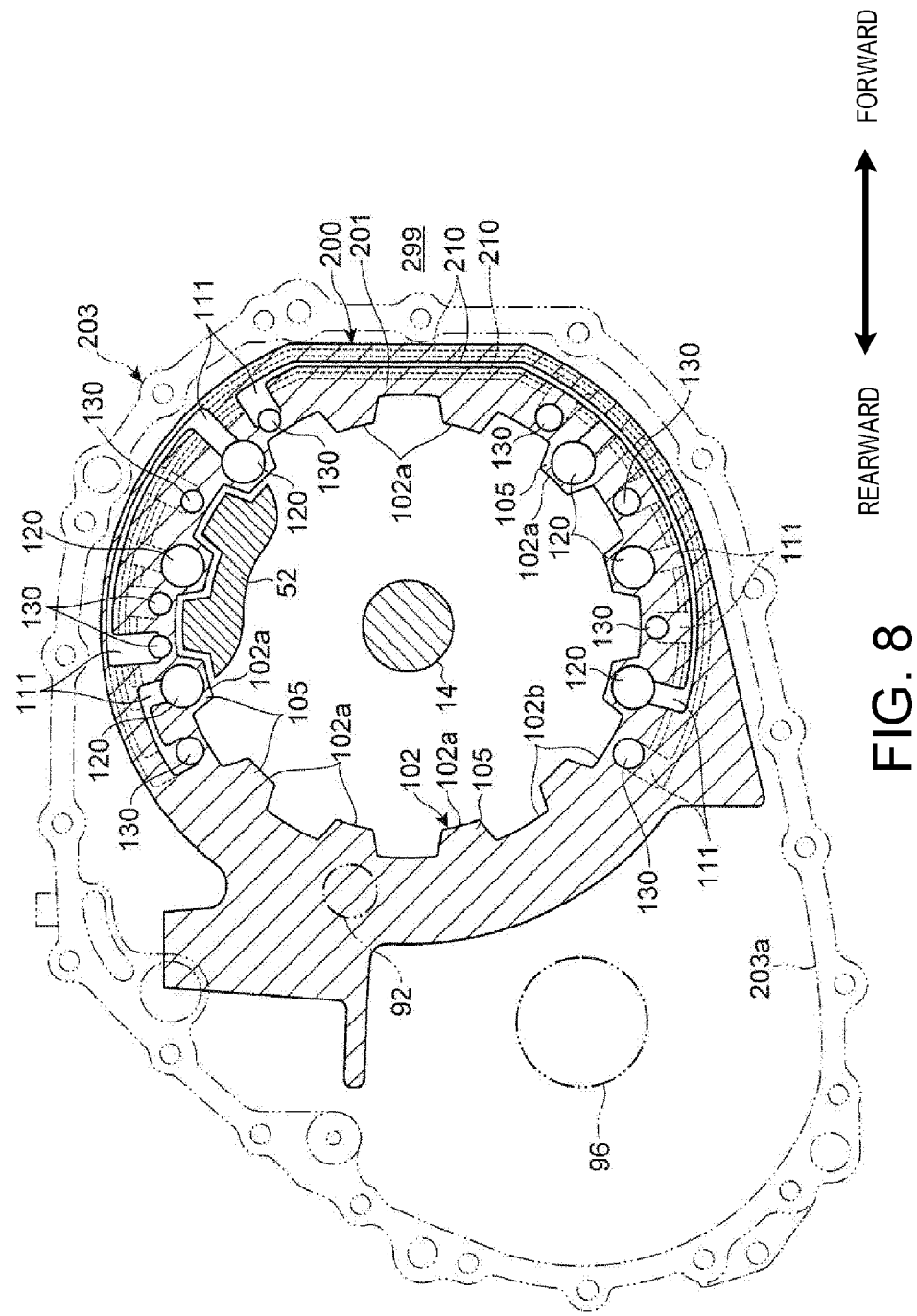
FIG. 8 is a cross-sectional view illustrating an automatic transmission according to a second embodiment of the present invention, in a manner similar to FIG. 6.

An automatic transmission according to a second embodiment is described with reference to FIG. 8. FIG. 8 is a cross-sectional view illustrating the automatic transmission according to the second embodiment of the present invention, in a manner similar to FIG. 6. Note that, in the second embodiment, similar components to the first embodiment are denoted with the same reference characters in FIG. 8, and description thereof is omitted.

As illustrated in FIG. 8, also in the second embodiment, a case body 203 of a transmission case includes a front-side cylindrical part 203a and a valve body 200 similarly to the first embodiment. The second embodiment is different from the first embodiment in which the oil paths 110 extend in an arc shape over an entire length thereof, in that a part of each oil path 210 of the valve body 200 extending in a circumferential direction of the valve body 200 is formed to extend substantially straight.

Specifically, the oil paths 210 are formed to extend substantially straight in up-and-down directions of a vehicle, in a part near an end of the valve body 200 on a front side of the vehicle. Accordingly, side faces of a cylindrical part 203a of the valve body 200 and the front-side cylindrical part 203a of the case body 203 on the vehicle front side are formed to be flat in the up-and-down directions of the vehicle.

Thus, projection of the case body 203 toward the vehicle front side is reduced, which leads to reducing the size of the automatic transmission 201 more effectively and enlarging a space 299 on the vehicle front side of the automatic transmission. Therefore, a large space for rearward movements of vehicle body members and on-board equipments disposed on the vehicle front side of the automatic transmission is secured. As a result, the automatic transmission can effectively be protected.

Third Embodiment

Figure 9:
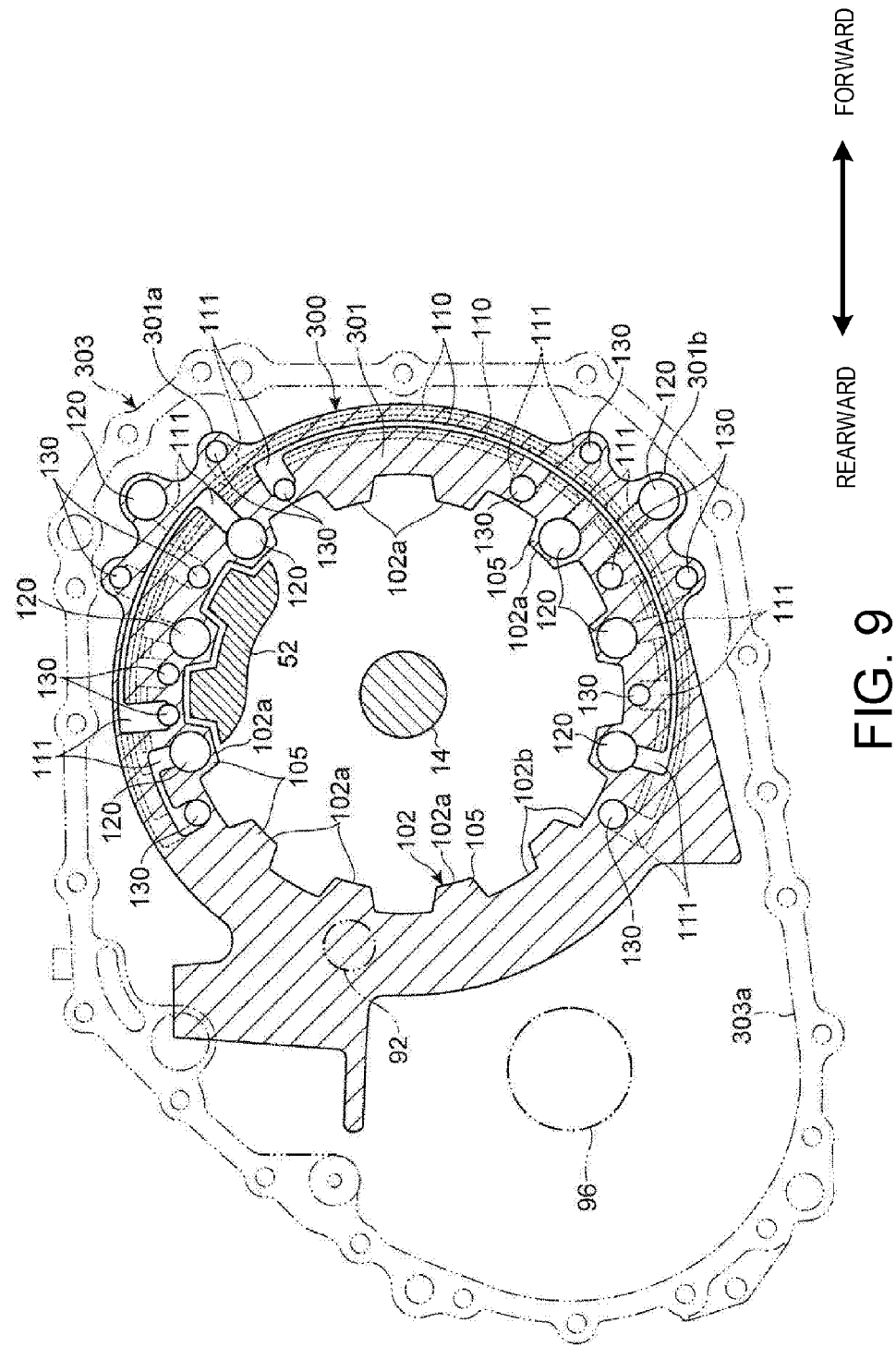
FIG. 9 is a cross-sectional view illustrating an automatic transmission according to a third embodiment of the present invention, in a manner similar to FIG. 6.

An automatic transmission according to a third embodiment is described with reference to FIG. 9. FIG. 9 is a cross-sectional view illustrating the automatic transmission according to the third embodiment of the present invention, in a manner similar to FIG. 6. Note that, in the third embodiment, similar components to the first embodiment are denoted with the same reference characters in FIG. 9, and description thereof is omitted.

As illustrated in FIG. 9, also in the third embodiment, a case body 303 of a transmission case includes a front-side cylindrical part 303a and a valve body 300, and the valve body 300 is formed with oil paths 110 extending in a circumferential direction of the valve body 300 similarly to the first embodiment. The third embodiment is different from the first embodiment in which all the valve insertion holes 120 and 130 are disposed radially inward relative to the oil paths 110, in that valve insertion holes 120 and 130 are formed not only on a radially inward side of the oil paths 110, but also on a radially outward side of the oil paths 110.

The valve body 300 is, for example, provided with a pair of protruding parts 301a and 301b protruding radially outward from an outer circumferential surface of the cylindrical part 301, so as to secure, on the radially outward side of the oil paths 110, parts where the valve insertion holes 120 and 130 are formed. One of the protruding parts 301a is formed to protrude obliquely upward to the vehicle front side from the outer circumferential surface of the cylindrical part 301, and the other protruding part 301b is formed to protrude obliquely downward to the vehicle front side from the outer circumferential surface of the cylindrical part 301.

Each of the protruding parts 301a and 301b is, for example, formed with two or more of the valve insertion holes 120 and 130, and these valve insertion holes 120 and 130 communicate with the oil paths 110 extending in the circumferential direction, through the communication oil paths 111.

By forming the valve insertion holes 120 and 130 in the protruding parts 301a and 301b of the valve body 300 as above, even in a case where an inner circumferential section of the valve body 300 alone is not sufficient to secure the space where the valve insertion holes 120 and 130 are formed, by utilizing the protruding parts 301a and 301b provided to the outer circumferential section of the valve body 300, a required number of valve insertion holes 120 and 130 can be formed.

Further, the valve insertion holes 120 and 130 formed on the outer circumferential side as above can easily be communicated with the oil paths 110 near the valve insertion holes 120 and 130 similarly to the valve insertion holes 120 and 130 formed on the inner circumferential side. Therefore, complication of the oil path structure is reduced.

Moreover, since the protruding parts 301a and 301b protrude obliquely upward or obliquely downward to the vehicle front side from the cylindrical part 301, an increase in a dimension of the valve body 300 in up-and-down directions of a vehicle can be reduced compared to a case where the protruding parts 301a and 301b protrude straight upward or straight downward, and an increase in a dimension of the valve body 300 in front-and-rear directions of the vehicle can be reduced compared to a case where the protruding parts 301a and 301b protrude horizontally to the vehicle front side. Therefore, a size reduction of the automatic transmission can be effectively achieved by integrating the valve body 300 with the case body 303, and sufficient vehicle mountability of the automatic transmission can be obtained.

Fourth Embodiment

Hereinafter, a structure of a transmission according to a fourth embodiment of the present invention is described with reference to the appended drawings.

Figure 10:
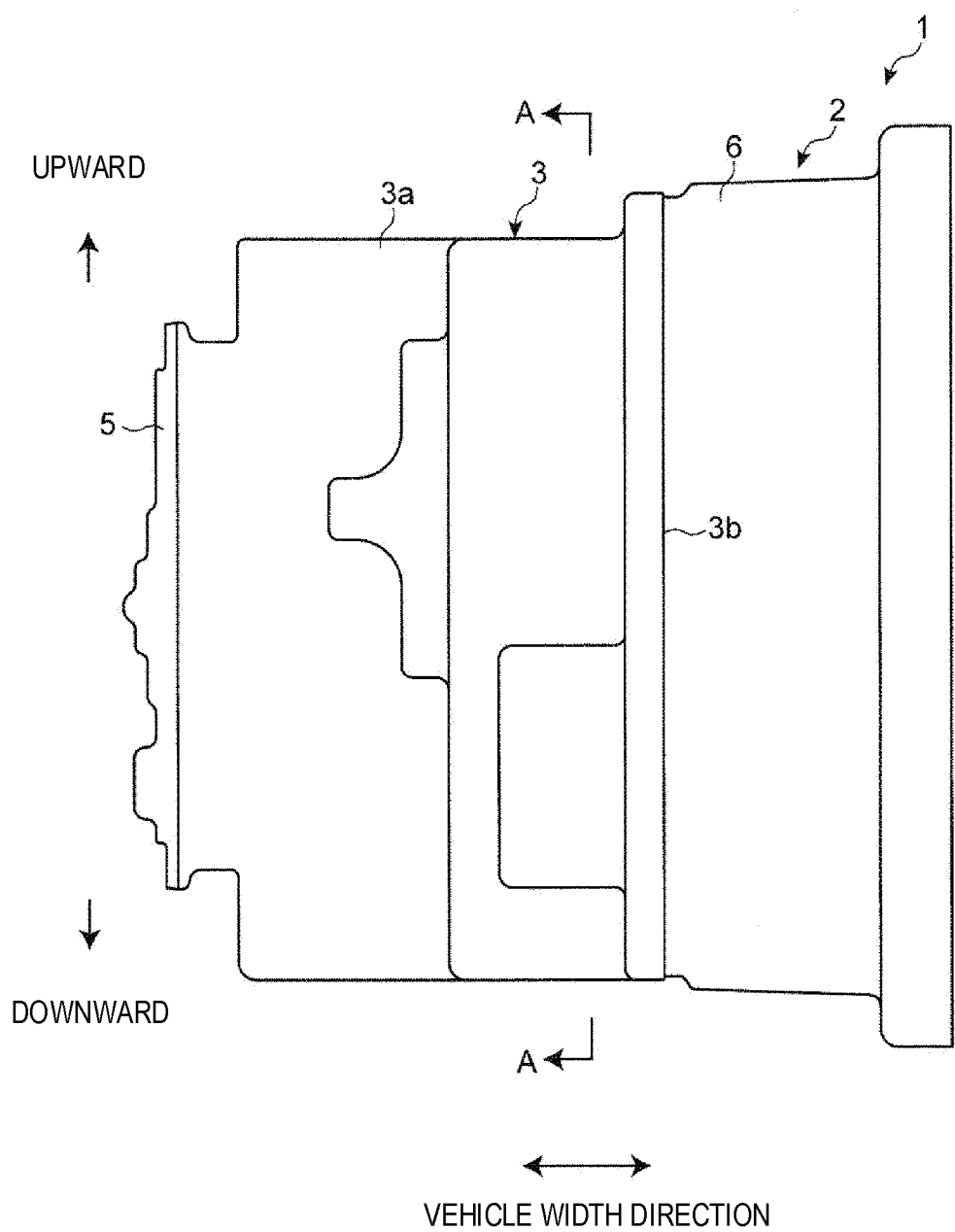
FIG. 10 is a view illustrating a transmission according to a fourth embodiment of the present invention, seen from a vehicle rear side.
Figure 11:
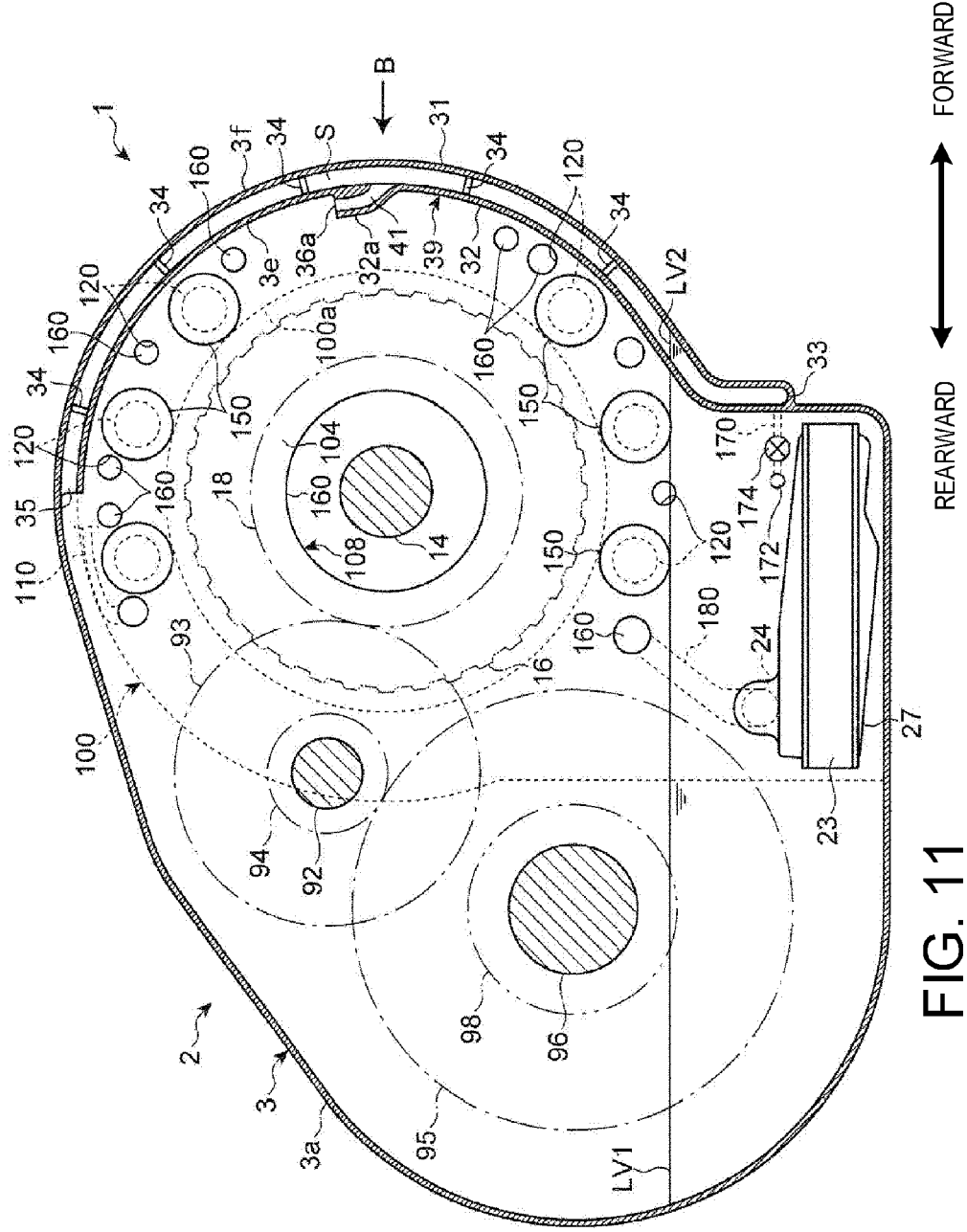
FIG. 11 is a cross-sectional view schematically illustrating an internal structure of the transmission, taken along a line A-A of FIG. 10.
Figure 12:
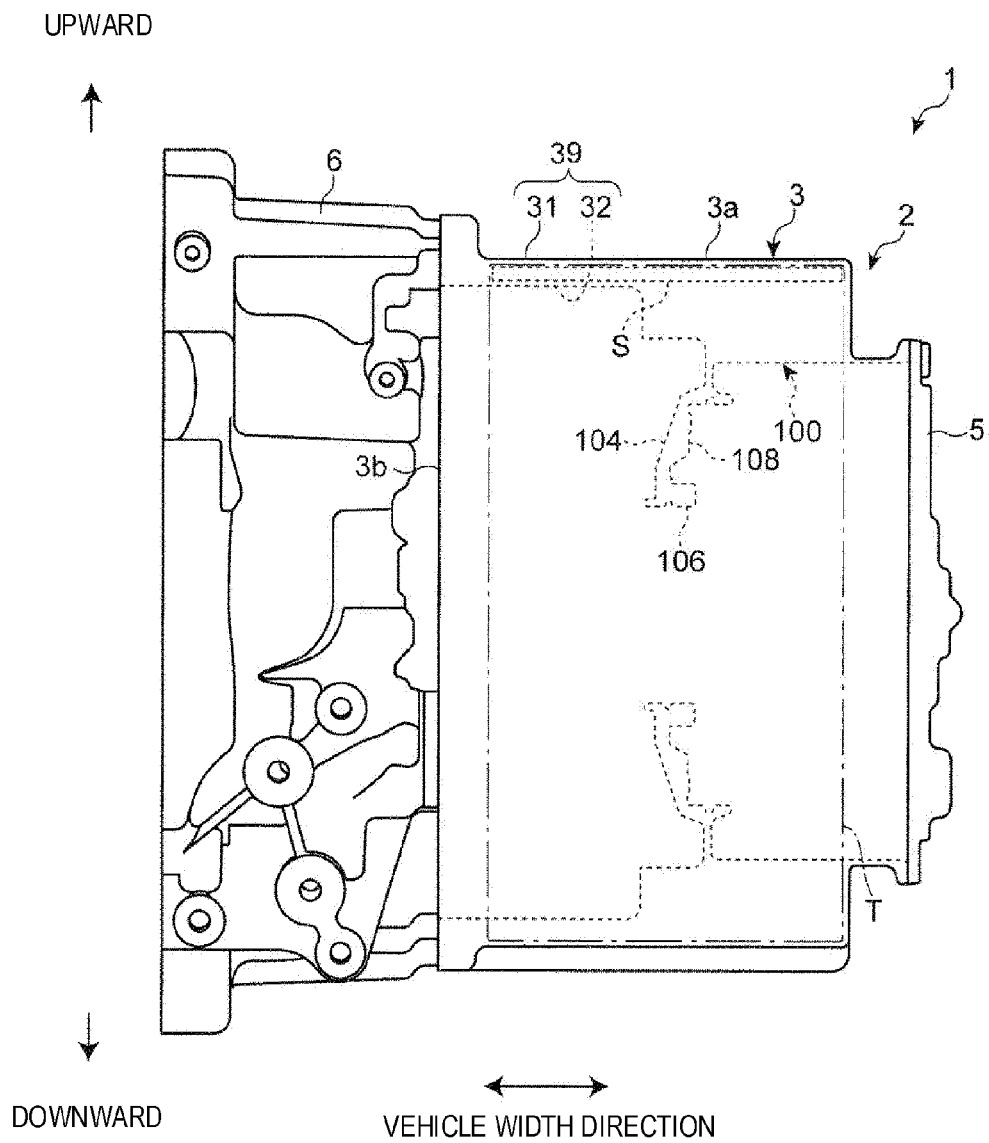
FIG. 12 is a view illustrating the transmission, seen in a direction of B of FIG. 11.

FIG. 10 is a view of the transmission according to this embodiment of the present invention, as seen from a vehicle rear side. FIG. 11 is a cross-sectional view schematically illustrating an internal structure of the transmission, taken along a line A-A of FIG. 10. FIG. 12 is a view illustrating the transmission, seen in a direction of B of FIG. 11. Note that in FIG. 11, illustration of a transmission mechanism is omitted for easier understanding of the present invention.

Overall Structure of Transmission

As illustrated in FIGS. 10 to 12, the transmission of this embodiment is an automatic transmission 1 to be applied to an automobile with a transverse engine (vehicle), such as a vehicle with a front-engine, front-wheel-drive layout. The automatic transmission 1 includes a transmission case 2 accommodating the transmission mechanism (not illustrated) that has an axis extending in a width direction of the vehicle. Note that, although it is not illustrated, a drive source (e.g., engine) is disposed, for example, on a right side of the automatic transmission 1 in the vehicle width direction.

As illustrated in FIG. 11, the transmission mechanism of the automatic transmission 1 includes an input shaft 14 extending along the axis and a counter drive gear 18 (an output part of the transmission mechanism) disposed on the same axis. The input shaft 14 is, for example, integrally formed with a non-illustrated turbine shaft (an output part of the torque converter) and coupled to the drive source via the torque converter.

Further, the automatic transmission 1 further includes a counter shaft 92 provided with a counter driven gear 93 meshing with the counter drive gear 18. The counter shaft 92 is disposed on a vehicle rear side of the input shaft 14 to be in parallel to the input shaft 14. The counter shaft 92 is further provided with a final drive gear 94 having a smaller diameter than the counter driven gear 93.

Left and right axles 96 are disposed at a position obliquely downward and on the vehicle rear side of the counter shaft 92, and the axles 96 are meshed with a differential ring gear 95 of a differential (not illustrated) disposed on the same axis as the axles 96. The differential ring gear 95 has a larger diameter than the final drive gear 94, and thus, an output rotation of the transmission mechanism is decelerated and transmitted to the differential, and a drive force inputted into the differential is transmitted to the left and right axles 96 so as to have a rotational difference therebetween according to a travelling status.

Note that the transmission mechanism includes a plurality of friction engaging elements, such as clutches and brakes, on the axis of the input shaft 14. A hydraulic controller performs an oil pressure control to selectively engage the friction engaging elements. Thus, a gear position is formed corresponding to a gear shift range and an operating state of the vehicle.

As illustrated in FIGS. 10 to 12, the transmission case 2 has a case body 3 forming an outer circumference thereof and an end cover 5 sealing an opening end part of the case body 3 on a counter drive source side (left). The case body 3 is a cylindrical member extending in axial directions of the transmission mechanism (the axial directions of the input shaft 14 and the counter shaft 92), and surrounds the transmission mechanism. Further, a mating surface 3*b* of an opening end part of the case body 3 on the drive source side (right) is coupled to a converter housing 6 accommodating the torque converter.

As illustrated in FIGS. 11 and 12, the case body 3 of the transmission case 2 is integrally formed with a valve body 100 of the hydraulic controller, a piston cylinder 108 of one of the brakes constituting the transmission mechanism, and an oil storage 39 (described later), by a three-dimensional additive manufacturing method. Thus, numbers of components and assembling processes are reduced and a size and weight of the entire automatic transmission 1 are also reduced.

As illustrated in FIG. 11, an oil strainer 23 is disposed inside the transmission case 2 near a bottom part thereof (hereinafter, this bottom part area inside the transmission case 2 is referred to as "the bottom section"). A lower surface of the oil strainer 23 is disposed to be opposite to the bottom part of the transmission case 2 at a close distance therefrom, and the lower surface of the oil strainer 23 is formed with a suction port 27. An upper part of the oil strainer 23 is formed with a discharge port 24, and the discharge port 24 communicates with oil paths of the valve body 100 (described later). Once an oil pump (not illustrated) is driven, oil stored in the bottom section of the transmission case 2 is introduced into the oil strainer 23 from the suction port 27, foreign matters are removed by a filter provided in the oil strainer 23, and then the oil is introduced into the oil paths of the valve body 100 from the discharge port 24.

Valve Body of Hydraulic Controller

As illustrated in FIGS. 11 and 12, the valve body 100 is entirely formed into a substantially cylindrical shape extending in the axial directions of the transmission mechanism and surrounds the transmission mechanism.

The piston cylinder 108 continues to the valve body 100 as an integral body to protrude inward in radial directions of the valve body 100 from an inner circumferential surface 100*a* of the valve body 100. The piston cylinder 108 includes an annular-shaped vertical wall part 104 extending radially inward from the inner circumferential surface of the valve body 100, and an inner cylindrical part 106 extending in the axial directions from an inner circumferential end portion of the vertical wall part 104 to the counter drive source side. The piston cylinder 108 is a substantially circumferential groove opening to the counter drive source side in the axial directions. The piston cylinder 108 accommodates a piston (not illustrated) of the brake of the transmission mechanism to form an oil pressure chamber (not illustrated).

Further, the valve body 100 is provided with a plurality of valve insertion holes 120 to which solenoid valves 150 and spool valves 160 are attached, and formed with the oil paths 110 communicating with these valve insertion holes 120.

The oil paths 110 communicating with the valve insertion holes 120 are formed by shaping the valve body 100 with the three-dimensional additive manufacturing method. Thus, compared to the conventional structure in which the oil paths are formed by molding, a high degree of freedom can be obtained for specific structures of the oil paths 110, such as orientations, arrangements, cross-sectional shapes, and number thereof. Therefore, for example, by extending most of the oil paths 110 in a circumferential direction of the valve body 100 to follow the shape of the valve body 100, the valve body 100 can be formed compactly in the radial directions.

The valve insertion holes 120 are formed by first forming pilot holes when shaping the valve body 100 by the three-dimensional additive manufacturing method, and then performing a finishing process on inner circumferential surfaces of the pilot holes. Here, the valve insertion holes 120 may be formed simply by machining, which is a process that is performed after shaping, without forming the pilot holes when shaping the valve body 100 by the three-dimensional additive manufacturing method.

The insertion holes 120 are disposed at a predetermined interval in the circumferential direction along the inner circumferential surface 100*a* of the valve body 100. All the valve insertion holes 120 are formed to extend in the axial directions of the transmission mechanism and open to the drive source side in the axial directions. Thus, when finish-processing the inner circumferential surfaces of the valve insertion holes 120, all the valve insertion holes 120 can be processed from the same direction, and when attaching the valves 150 and 160 to the valve insertion holes 120, all the valves 150 and 160 can be inserted from the same direction.

The solenoid valves 150 and the spool valves 160 constitute a hydraulic control circuit (not illustrated) along with the oil paths 110 of the valve body 100. By operating the solenoid valves 150 and the spool valves 160, the hydraulic control circuit controls supply and discharge of oil to and from oil pressure chambers of the friction engaging elements which constitute the transmission mechanism, lubricated parts inside the transmission case 2 (meshed portions, bearings, for example, of the gears of the transmission mechanism), various parts of the torque converter, for example.

As a solenoid valve 150, one of a linear solenoid and an on-off solenoid valve is used. The linear solenoid valve is, for example, used as a valve for directly controlling oil pressure to the oil pressure chambers of the friction engaging elements. The on-off solenoid valve is, for example, used as a valve for opening and closing an oil pressure transmission path to a control port of the spool valve 160.

The spool valves 160 may function as various switch valves, such as a pressure regulator valve for adjusting a discharge pressure of the mechanical oil pump to a line pressure, a manual valve for switching the oil pressure transmission path in conjunction with an operation of a gear shift lever performed by a driver of the vehicle, and a failsafe valve for switching the oil pressure transmission path to achieve a predetermined gear position when the solenoid valves 150 fail.

Moreover, the valve body 100 is formed with an introducing oil path 180 for introducing the oil discharged from the discharge port 24 of the oil strainer 23. The introducing oil path 180 is formed in the valve body 100 to connect, for example, the discharge port 24 with an input port of the spool valves 160 functioning as, for example, the pressure regulator valve.

Note that the valve body 100 may further be provided integrally with other components constituting the hydraulic control circuit, such as a check valve and an orifice. Further, in a case where the check valve, the orifice, for example, are formed as separate components from the valve body 100, attached portions, such as holes to which the separate components are attached, may be formed in the valve body 100.

Oil Storage

As illustrated in FIG. 11, oil drained from the oil pressure chambers for example, in the oil control by the hydraulic controller described above, and oil used for lubricating and cooling inside the transmission case 2, are introduced into the bottom section of the transmission case 2 by passing through the oil paths 110 of the valve body 100, oil holes (not illustrated) which are formed in the input shaft 14, the counter shaft 92, the end cover 5, for example, or falling along an inner surface 3e of a circumferential wall 3a of the case body 3, for example. Thus, the oil is accumulated in the bottom section of the transmission case 2. The bottom section of the transmission case 2 functions as the oil storage, and the oil stored in the bottom section of the transmission case 2 is supplied to various parts through the oil strainer 23 and the hydraulic controller.

The automatic transmission 1 of this embodiment further includes another oil storage 39 different from the bottom section of the transmission case 2. The oil storage 39 is provided in a part of the circumferential wall 3a of the case body 3 of the transmission case 2 by being formed integrally with the circumferential wall 3a.

Specifically, the oil storage 39 is provided in a cross-sectionally semicircular part of the circumferential wall 3a to extend continuously thereto in the circumferential direction, for example. The cross-sectionally semicircular part is located on a vehicle front side in the circumferential wall 3a. Further, in a part of the circumferential wall 3a indicated as an area T in FIG. 12, the oil storage 39 is provided to continue thereto in the vehicle width direction. In other words, when the circumferential wall 3a is seen from the vehicle front side, the area T where the oil storage 39 is provided covers a range of a major part of the circumferential wall 3a in the vehicle width direction and a range from an upper end part to near a lower end part of the circumferential wall 3a in up-and-down directions of the vehicle.

Note that, the area of the circumferential wall 3a where the oil storage 39 is provided is not limited to this example and may arbitrarily be changed. Moreover, the oil storage 39 may be provided over the entire circumferential wall 3a or divided into a plurality of areas inside the circumferential wall 3a.

As illustrated in FIG. 11, the oil storage 39 constitutes a part of the circumferential wall 3a. The part of the circumferential wall 3a where the oil storage 39 is provided has a double-wall structure having an outer wall part 31 and an inner wall part 32 disposed at a predetermined interval in a thickness direction of the circumferential wall 3a. In the oil storage 39, the outer wall part 31 forms an outer surface 3f of the circumferential wall 3a, and the inner wall part 32 forms the inner surface 3e of the circumferential wall 3a. In other words, the oil storage 39 is formed between outer surface 3f and inner surface 3e of the circumferential wall 3a.

Since a part of the circumferential wall 3a is formed by the outer and inner wall parts 31 and 32 disposed with the predetermined interval therebetween, the oil storage 39 is formed by hollowing this part of the circumferential wall 3a, and thus, an oil containing space S is formed between the outer and inner wall parts 31 and 32.

The outer and inner wall parts 31 and 32 are disposed at a close distance from each other to reduce the thickness of the oil storage 39. Moreover, since the oil storage 39 is formed over a wide range of the circumferential wall 3a as described above, even if the interval between the outer and inner wall parts 31 and 32 is narrowed, a large oil containing space S can be formed.

Lower end portions of the outer and inner wall parts 31 and 32 are integrally connected via a bottom wall part 33. The bottom wall part 33 forms a bottom surface of the oil containing space S. The bottom wall part 33 is, for example, disposed on the upper side of the suction port 27 of the oil strainer 23.

Note that both end parts of the outer wall part 31 in the vehicle width direction are integrally connected with both end parts of the inner wall part 32 in the vehicle width direction via side wall parts (not illustrated), respectively, and side surfaces of the oil containing space S are formed by these side wall parts.

Figure 15:
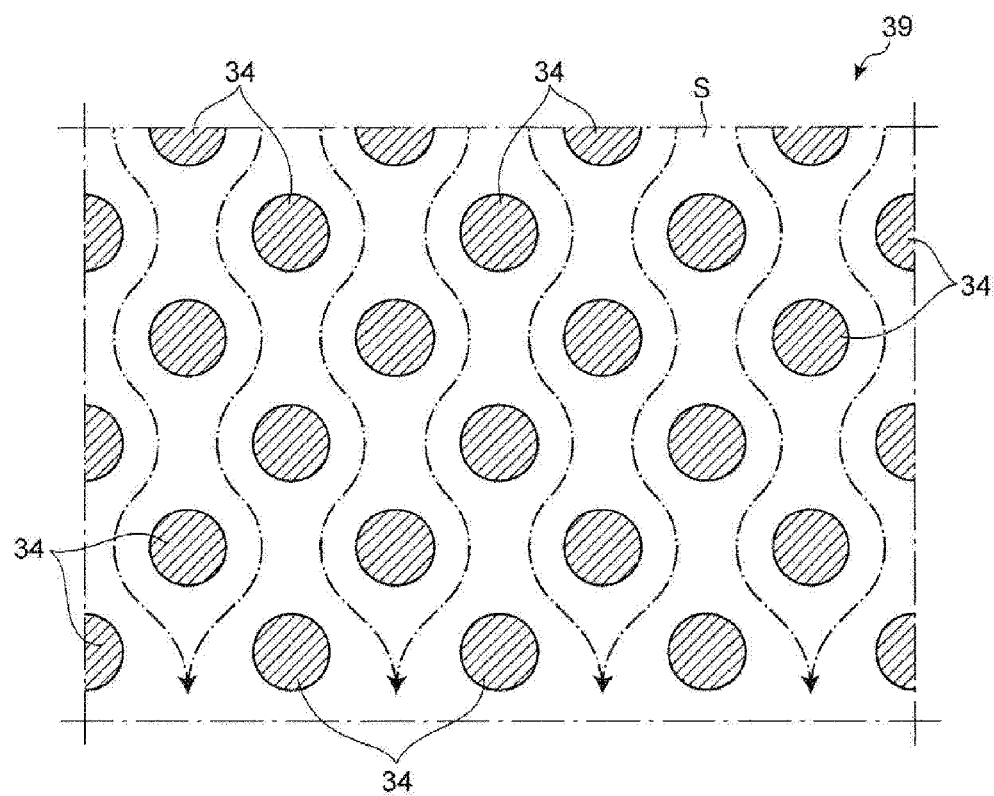
FIG. 15 is an enlarged cross-sectional view illustrating an inside of an oil storage seen in a thickness direction thereof.

Further, the oil storage 39 is provided with a plurality of pillar-shaped reinforcing parts 34 integrally connecting the outer and inner wall parts 31 and 32 with each other. The reinforcing parts 34, for example, extend substantially straight in the thickness direction from the outer wall part 31 to the inner wall part 32. As illustrated in FIG. 15, the plurality of reinforcing parts 34 are disposed at predetermined intervals in the axial directions and the circumferential direction of the circumferential wall 3a.

In the oil storage 39, since the outer and inner wall parts 31 and 32 are integrally connected with each other by the reinforcing parts 34 provided as described above, stiffness against a load particularly applied from the outside in the thickness direction is increased. Further, even in such a case where the reinforcing parts 34 interpose between the outer and inner wall parts 31 and 32, the oil stored in the oil storage 39 can fall downward while curving around the reinforcing parts 34.

Note that, as long as the reinforcing parts 34 integrally connect the outer and inner wall parts 31 and 32 with each other, the structure of the reinforcing parts 34 is not limited to the above description, and various modifications may be applied.

Figure 17A:
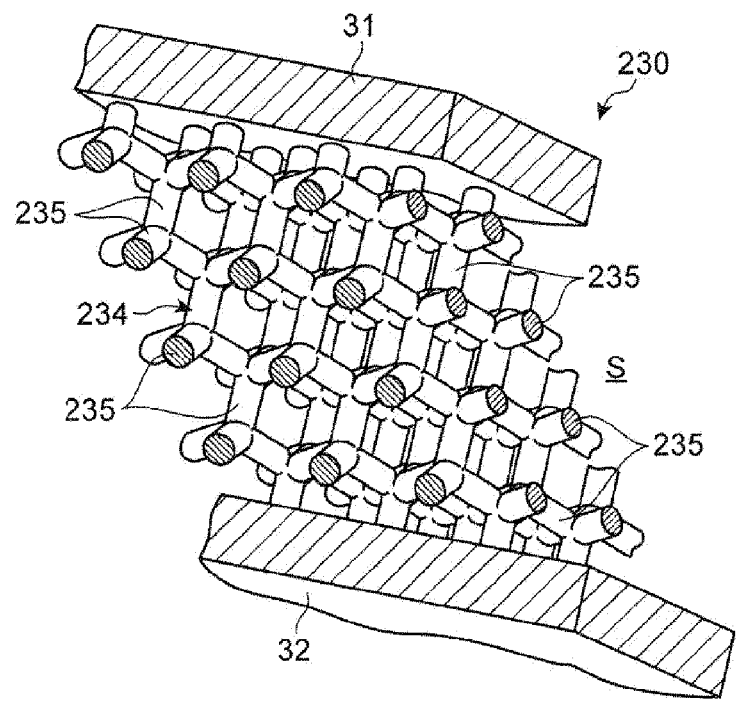
FIGS. 17A and 17B are a perspective view and a cross-sectional view illustrating a modified example of the structure of the oil storage.
Figure 17B:
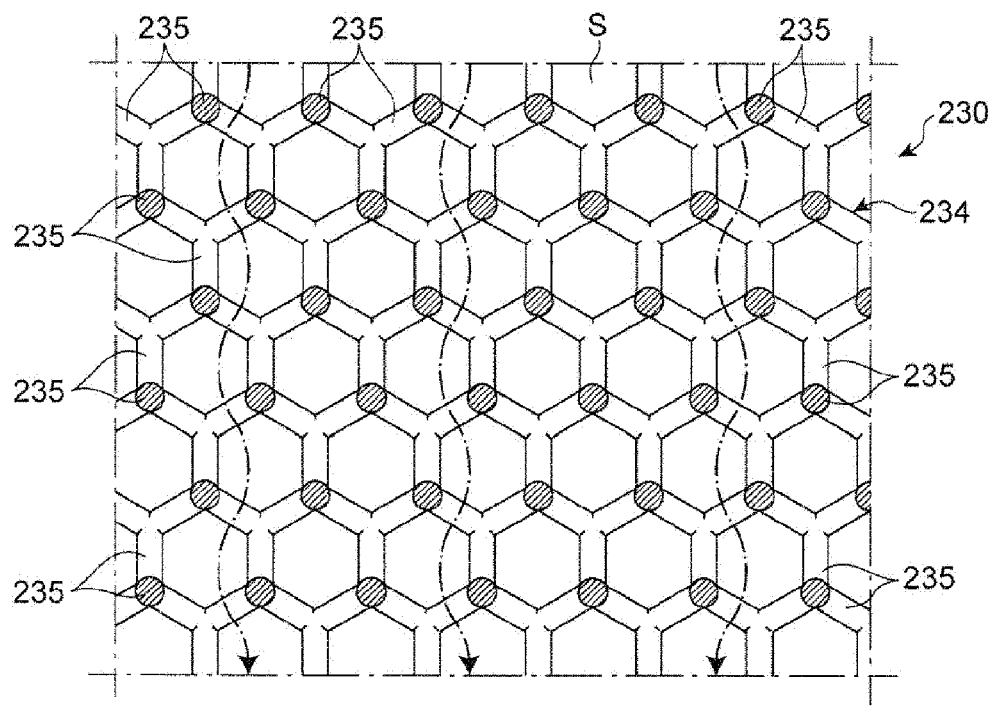

Instead of the reinforcing parts 34 described above, as an oil storage 230 illustrated in FIG. 17A, a reinforcing part 234 formed by integrally and three-dimensionally connecting a plurality of pillar-shaped portions 235 extending in different four directions with each other may be alternatively provided, for example. In this case, as illustrated in FIG. 17B, the pillar-shaped portions 235 of the reinforcing part 234 are arranged to have a honeycomb shape in the thickness direction. By integrally connecting the outer wall part 31 with the inner wall part 32 via such a reinforcing part 234, sufficient stiffness of the hollowed oil storage 39 can be secured against a load from any one of the thickness direction of the circumferential wall 3a, the axial directions, and the circumferential direction.

Moreover, although not illustrated, in another example, a film-like reinforcing part formed by integrally and two-dimensionally connecting a plurality of pillar-shaped portions extending in three different directions with each other to have a mesh shape may be provided. In this case, the film-like reinforcing part is preferably provided at a plurality of positions at a predetermined interval in a direction perpendicular to the thickness direction of the circumferential wall 3a.

As illustrated in FIG. 11, the oil storage 39 is formed with introducing openings 35 and 36a for introducing oil into the oil containing space S. Specifically, the oil storage 39 is formed with the upper introducing opening 35 in an upper end part thereof, and the lower introducing opening 36a formed on the lower side of the introducing opening 35.

The upper introducing opening 35 is formed by an upper end opening of the oil storage 39 and opens to a vehicle rear side. The lower introducing opening 36a is formed in a protrusion 32a protruding inward in the thickness direction from an intermediate portion of the inner wall part 32 in the circumferential direction. The protrusion 32a is formed with an oil path 41 extending in the up-and-down directions. An upper end of the oil path 41 is the introducing opening 36a and a lower end of the oil path 41 communicates with the oil containing space S.

By forming these introducing openings 35 and 36a, when oil adhered to rotary bodies inside the transmission case 2, such as the gears 18, 93, 94 and 95, a clutch drum 16, for example, disperses from these rotary bodies, part of the dispersed oil can efficiently be introduced into the oil containing space S from the introducing openings 35 and 36a.

Moreover, the oil storage 39 may be further formed with an introducing opening communicating with the oil paths 110 of the valve body 100, and in this case, the introduction of oil into the oil containing space S from the oil paths 110 of the valve body 100 can be controlled by the hydraulic controller.

Further, the oil containing space S of the oil storage 39 communicates with an internal space of the transmission case 2, or in other words, the space surrounded by the inner surface of the circumferential wall 3a, via a communicating oil path 170. The communicating oil path 170 is formed in the valve body 100, for example. One end of the communicating oil path 170 communicates with the oil containing space S via an opening (not illustrated) formed near the lower end of the inner wall part 32 of the oil storage 39. The other end of the communicating oil path 170 communicates with the internal space of the transmission case 2 via a discharge port 172 formed in the valve body 100.

The communicating oil path 170 is formed with a valve 174 for opening and closing the oil path 170. The valve 174 is attached, for example, to a valve insertion hole (not illustrated) formed in the valve body 100.

Note that, the communicating oil path 170, the discharge port 172, and the valve 174 are not necessarily provided in the valve body 100 as long as they can communicate the oil containing space S of the oil storage 39 with the internal space of the transmission case 2.

As described above, the oil containing space S of the oil storage 39 is communicable with the internal space of the transmission case 2 via the communicating oil path 170, and the communicating oil path 170 is openable and closable by the valve 174. With this structure, by controlling an operation of the valve 174, an oil supply from the oil containing space S to the internal space of the transmission case 2 can be controlled. Thus, by controlling the oil supply from the oil containing space S to the internal space of the transmission case 2 according to an operating state of the vehicle, an oil temperature, an oil level LV1 inside the transmission case 2, for example, the oil level LV1 inside the transmission case 2 can be suitably adjusted, which can stabilize the oil level LV1 regardless of the operating state of the vehicle, the oil temperature, for example. Therefore, a total oil amount contained inside the transmission case 2 can be reduced. As a result, the weight of the automatic transmission 1 can be reduced.

Figure 13A:
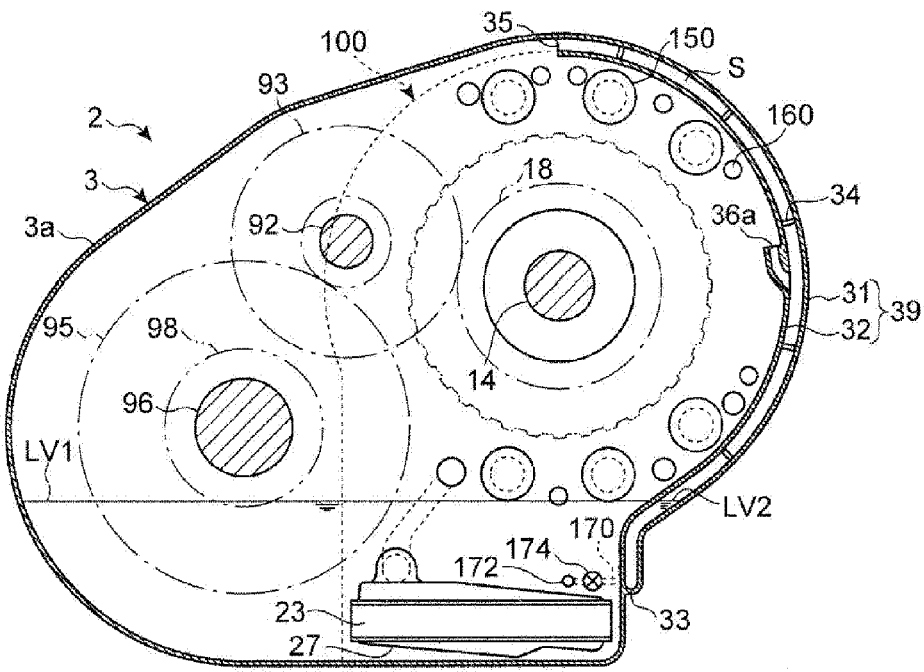
FIGS. 13A and 13B are cross-sectional views illustrating the internal structure of the transmission in a stopped state of a vehicle, in a manner similar to FIG. 11.
Figure 13B:
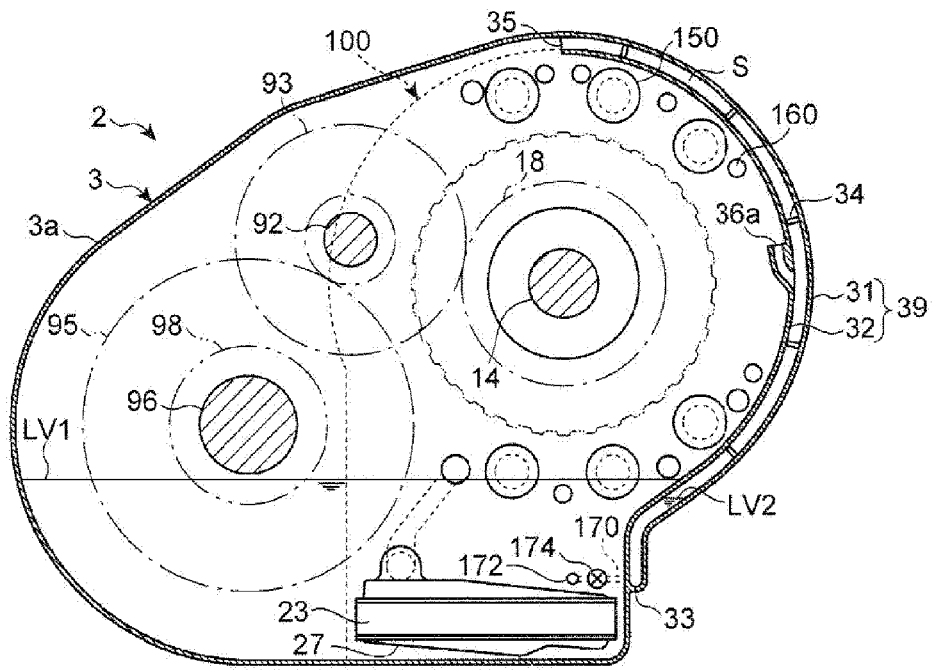

FIG. 13A illustrates a specific example of an ideal level of the oil level LV1 inside the transmission case 2 and an actual oil level LV2 inside the oil storage 39 when the oil temperature is low in a stopped state of the vehicle, and FIG. 13B illustrates a specific example of an ideal level of the oil level LV1 inside the transmission case 2 and the actual oil level LV2 inside the oil storage 39 when the oil temperature is high in the stopped state of the vehicle.

In the stopped state illustrated in FIGS. 13A and 13B, since the mechanical oil pump is stopped, lubricating oil is not supplied from the oil pump. Thus, bearings 98 supporting the axles 96 are soaked in the oil in the differential. Therefore, in the stopped state, the ideal level of the oil level LV1 is set higher than lower ends of the bearings 98. Note that, when the oil temperature is high, since the oil expands and a volume of the oil becomes comparatively large, compared to when the oil temperature is low, the ideal level of the oil level LV1 is set slightly high.

Therefore, in the stopped state, when the oil level LV1 inside the transmission case 2 is lower than the ideal level, by opening the valve 174 to supply oil into the internal space of the transmission case 2 from the oil storage 39, the oil level LV1 can be adjusted. By performing such an oil supply, the oil level LV2 inside the oil storage 39 becomes comparatively low.

Note that, although the oil dispersed from the rotary bodies is adhered to the inner surface 3e of the circumferential wall 3a of the transmission case 2, for example, while the vehicle travels, if the stopped state continues for a long period of time, the majority of the oil drops and is accumulated in the bottom section of the transmission case 2. In such a stopped state where the oil level LV1 is sufficiently high, the oil supply from the oil storage 39 is not required.

Figure 14A:
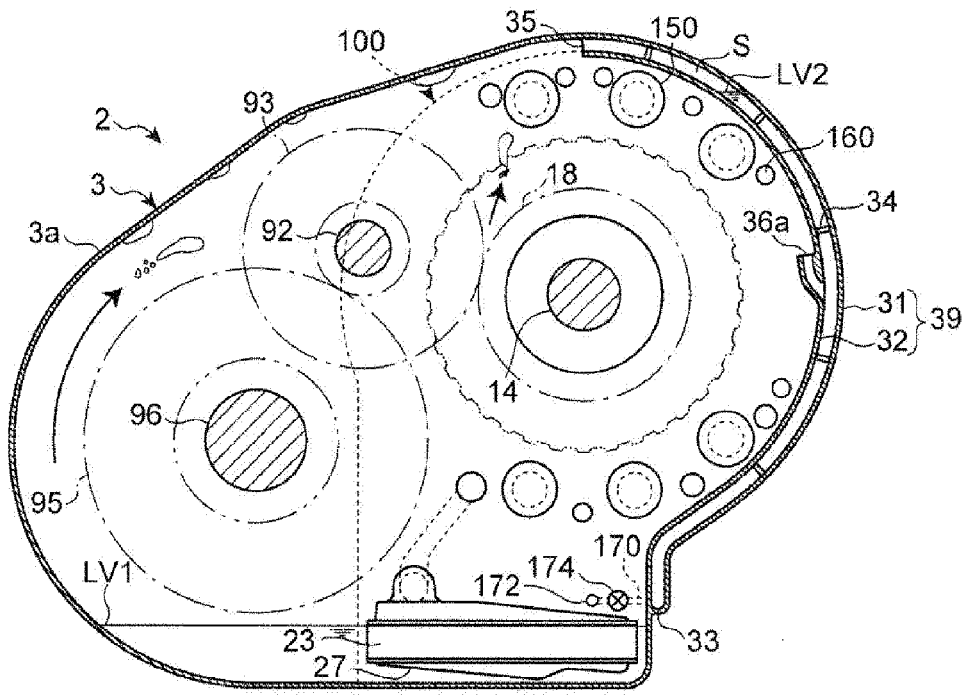
FIGS. 14A and 14B are cross-sectional views illustrating the internal structure of the transmission in a traveling state of the vehicle, in a manner similar to FIG. 11.
Figure 14B:
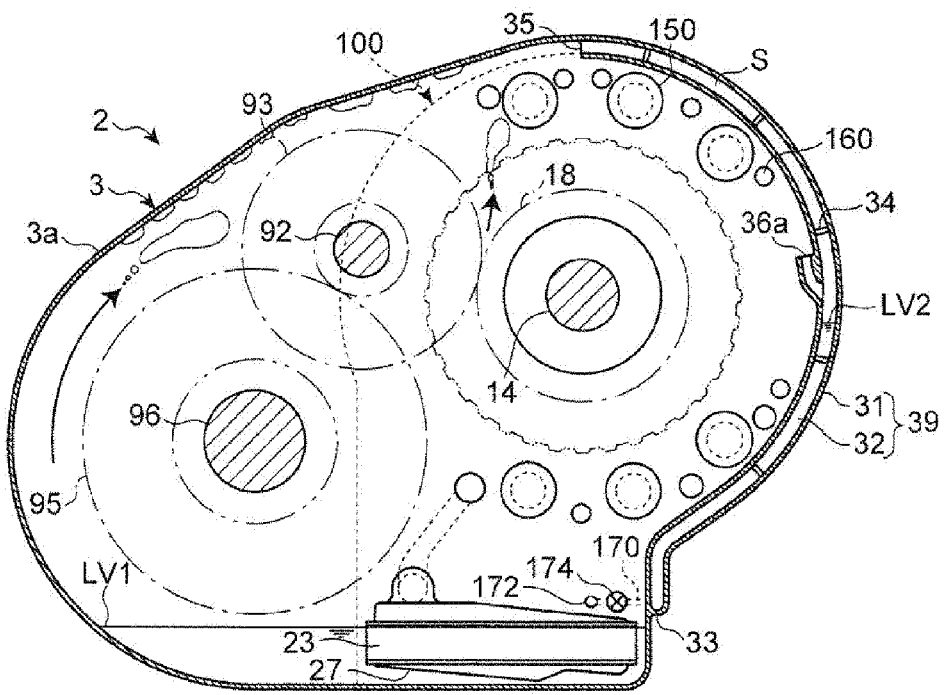

FIG. 14A illustrates a specific example of an ideal level of the oil level LV1 inside the transmission case 2 and the actual oil level LV2 inside the oil storage 39 while the vehicle travels at a low speed, and FIG. 14B illustrates a specific example of an ideal level of the oil level LV1 inside the transmission case 2 and the actual oil level LV2 inside the oil storage 39 while the vehicle travels at a high speed.

As illustrated in FIGS. 14A and 14B, while the vehicle travels, in order to reduce rotational resistance of the differential gear 95, the oil level LV1 inside the transmission case 2 is preferably lower than the lower end of the differential gear 95.

On the other hand, while the vehicle travels, when the differential gear 95 is soaked in the oil stored in the bottom section of the transmission case 2, the oil is scraped by the differential gear 95, and the oil adheres to various parts inside the transmission case 2. Thus, the oil level LV1 inside the transmission case 2 easily becomes low. Particularly when the oil temperature is low and viscosity of the oil is high, the oil adhered to the various parts of the transmission case 2 does not easily drop to the bottom section of the transmission case 2, and the oil level LV1 is easily lowered.

Further, while the vehicle travels, by supplying part of the oil dispersed from the rotary bodies, such as the gears 18/93 and the clutch drum 16, into the oil storage 39, the oil level LV2 inside the oil storage 39 rises compared to the stopped state.

In the low speed traveling state illustrated in FIG. 14A, the amount of oil scraped from the differential gear 95 is comparatively small, whereas in the high speed traveling state illustrated in FIG. 14B, the amount of oil scraped from the differential gear 95 becomes large, which may excessively lower the oil level LV1. In this case, by opening the valve 174 to supply the oil from the oil storage 39, the oil level LV1 inside the transmission case 2 may be raised. Thus, a suction of air can be prevented while maintaining a state where the suction port 27 is soaked in the oil.

Manufacturing Method of Case Body

The case body 3 of the transmission case 2 is integrally formed with the oil storage 39, the valve body 100, and the piston cylinder 108 by the three-dimensional additive manufacturing method using a 3D printer. Thus, the entire case body 3, except for the hollow parts, such as the valve insertion holes 120, the oil paths 110, and the oil containing space S, is formed to be integrally continuous.

Although the specific printing method in the three-dimensional additive manufacturing method is not particularly limited, in a case of using metal (e.g., aluminum) for a material of the case body 3, for example, a selective laser sintering method may be adopted, which repetitively performs an operation of irradiating any position of a layer paved with metallic powder with one of an electron beam and a laser to sinter and shape the irradiated part, and then paves the next layer.

Further, in a case of using plastic for a material of the case body 3, although the selective laser sintering method may be adopted, a larger variety of printing methods can be adopted compared to the case of using a metal material, and a printing method which satisfies a particular need, such as an inkjet method, may be adopted. Note that, in the case of forming the case body 3 with plastic, the entire case body 3 may be covered by a cylindrical member made of metal so as to increase the stiffness of the transmission case 2.

Figure 16:
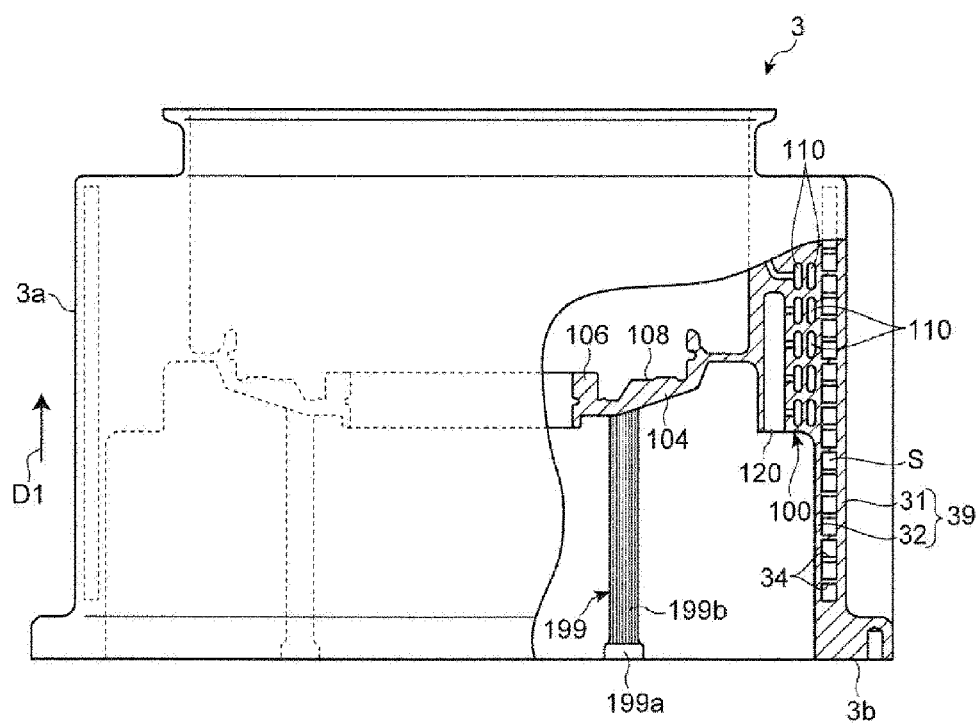
FIG. 16 is a partially-cut side view illustrating a case body of a transmission case, the oil storage, a valve body, a piston cylinder, and supporting parts formed integrally by a three-dimensional additive manufacturing method.

As illustrated in FIG. 16, in the formation of the case body 3 by the three-dimensional additive manufacturing method, a laminating direction D1 is oriented upward, and the case body 3 is formed in such an orientation that the axis of the valve body 100, the axes of the valve insertion holes 120, and the axis of the case body 3 extend in up-and-down directions of the lamination (corresponding to the laminating direction D1).

To stably shape the case body 3, especially the piston cylinder 108, supporting parts 199 for supporting a part to be the piston cylinder 108 from below during the shaping process, are preferably formed integrally with the case body 3 to extend upward from a lower end in the laminating direction D1. Each supporting part 199 includes, for example, a flat circular column portion 199a formed at the lower end in the laminating direction D1, and a long cylindrical portion 199b extending upward from the circular column portion 199a. The supporting part 199 is provided, for example, at a position for supporting the vertical wall part 104.

Since the supporting parts 199 are integrally shaped with the case body 3 as above, the shaping of the piston cylinder 108, the valve body 100, and the oil storage 39 on the supporting parts 199 can be stably performed with support from below by the supporting parts 199. Therefore, these components can be formed at high quality.

Moreover, since the valve insertion holes 120 are formed along their axes which are parallel to the laminating direction D1 of the three-dimensional additive manufacturing method, the valve body 100 is stably formed without deforming the inner circumferences of the valve insertion holes 120. Thus, the valve insertion holes 120 can be formed at high quality. Therefore, a smooth movement of the spools in the valve insertion holes 120, which are configured for the spool valves, can particularly be achieved, which results in achieving an oil pressure control with high responsiveness.

After the shaping process of the case body 3 by the three-dimensional additive manufacturing method is finished, the supporting parts 199 are removed. Since the cylindrical portions 199b of the supporting parts 199 are hollow inside and have low stiffness, the supporting parts 199 can be easily removed.

Then, a finishing process is performed on the inner circumferential surfaces and end surfaces of the valve insertion holes 120, parts connected with the supporting parts 199, for example, and a thread cutting process is performed on bolt holes formed on both end surfaces of the case body 3. Thus, the case body 3 is completed.

Note that, the supporting parts 199 are not essential, and particularly in a case of shaping by using a plastic material, depending on the adopted printing method (e.g., selective laser sintering method), the supporting parts 199 may be omitted.

As described above, the oil storage 39 described above is integrally formed with the circumferential wall 3a of the case body 3 by the three-dimensional additive manufacturing method, and the oil storage 39 is formed in the part of the circumferential wall 3a. Therefore, while forming the oil storage 39 compactly in the thickness direction of the circumferential wall 3a, by using a large part of an area of the circumferential wall 3a, a sufficient volume of the oil storage 39 can be secured. Thus, there is no need to secure a large space for disposing the oil storage 39 inside the transmission case 2 or forming a large oil storage on the outside of the transmission case 2. By this, a degree of freedom in layouts of the various components disposed inside the transmission case 2 can be increased, and reductions in size and weight of the automatic transmission 1 can be achieved.

Moreover, since the oil storage 39 is integrally formed with the circumferential wall 3a, compared to the conventional technique which requires a member for forming the oil storage 39 such as a bracket for attaching the member to the transmission case 2, the numbers of components and assembling processes can be reduced.

Furthermore, since the case body 3 is also formed integrally with the valve body 100, a part of the case body 3 is also used as the oil storage 39 and the valve body 100, compared to the case where the transmission case, the oil storage, and the valve body are individually formed as separate bodies, the material for forming these components can be reduced. Therefore, the size and weight of the entire automatic transmission 1 can be reduced. As a result, vehicle mountability of the automatic transmission 1 and fuel performance of the vehicle can be improved.

Although the present invention is described by giving the examples in the embodiments described above, the present invention is not limited to the embodiments described above.

For example, in the embodiments described above, the examples in which the valve body is formed into the cylindrical shape to surround the entire circumference of the transmission mechanism are described; however, in the present invention, as long as the valve body extends in the circumferential direction of the transmission mechanism along an outer circumference of the transmission mechanism, it may be disposed to surround only a part of the transmission mechanism in the circumferential direction.

Further, in the embodiments described above, the examples in which the valve body is integrally provided with the front-side cylindrical part are described; however, in the present invention, as long as the valve body constitutes a part of the transmission case, it may be a separate body from the front-side cylindrical part.

Further, in the embodiment described above, the example in which the valve body and the piston cylinder are integrated with the case body and the oil storage is described; however, in the present invention, the valve body and the piston cylinder may be separate bodies from the transmission case.

Moreover, in the embodiments described above, the examples in which the valve body is a separate body from the end cover of the transmission case are described; however, the present invention does not exclude embodiments in which the valve body is integrally provided with the end cover.

Furthermore, in the embodiments described above, the examples in which the transmission case is structured by the three members of the case body, the oil pump housing, and the end cover are described; however, in the present invention, the number of members constituting the transmission case is not particularly limited, and the transmission case may be structured by at least a single member including a member integrally formed with the valve body by the three-dimensional additive manufacturing method.

Further, in the embodiment described above, the example in which the oil storage is provided to adjust the oil level LV1 inside the transmission case is described; however, in the present invention, the application of the oil storage is not limited and, for example, it may temporarily store lubricating oil.

Furthermore, in the embodiment described above, the example in which the present invention is applied to the automatic transmission is described; however, the present invention may similarly be applied to a manual transmission.

As described above, according to the present invention, a size and weight of a transmission, and numbers of components and assembling processes thereof can be reduced, and a degree of freedom in layouts of various components disposed inside a transmission case of a transmission can be increased. Therefore, the present invention may suitably be utilized in fields of manufacturing industries of transmissions, and vehicles on which the transmission is mounted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

What is claimed is:
1. A transmission, comprising:
a transmission case accommodating a transmission mechanism;
a hydraulic controller having a valve body and a valve configured to control the transmission mechanism, the valve body being formed with a valve insertion hole into which the valve is inserted, the valve body also having an oil path communicating with the valve insertion hole;
an oil storage configured to store oil; and
a discharge port provided in the valve body and configured to communicate an internal space of the transmission case with an oil containing space of the oil storage and supply oil stored in the oil storage into the internal space of the transmission case,
wherein the oil storage is integrally continuous with and inseparable from the transmission case,
wherein the valve body extends along an outer circumference of the transmission mechanism,
wherein the valve body is integrally formed with the transmission case by a three-dimensional additive manufacturing method,
wherein an axis of the transmission mechanism and an axis of the valve insertion hole are disposed in a laminating direction of the three-dimensional additive manufacturing method,
wherein a spline, to which an outer circumferential part of a friction plate of a brake of the transmission mechanism is fitted, is formed along an inner circumference of the valve body, and
wherein at least a part of the valve insertion hole is located in at least one of a plurality of inward protrusions that form teeth of the spline.

2. The transmission of claim 1, wherein the oil storage includes an outer wall part forming an outer surface of a circumferential wall of the transmission case, and an inner wall part disposed on an inner side of the outer wall part at a predetermined interval therefrom to form an inner surface of the circumferential wall, and
wherein the oil storage is provided with a pillar-shaped supporting part integrally connecting the outer wall part with the inner wall part.

3. The transmission of claim 2, wherein the transmission case is a cylindrical member extending in axial directions of the transmission mechanism.

4. The transmission of claim 3, further comprising:
a communicating section communicating the oil containing space of the oil storage with the internal space of the transmission case; and
a communicating section valve configured to open and close the communicating section.

5. The transmission of claim 2, further comprising:
a communicating section communicating the oil containing space of the oil storage with the internal space of the transmission case; and
a communicating section valve configured to open and close the communicating section.

6. The transmission of claim 1, wherein the transmission case is a cylindrical member extending in axial directions of the transmission mechanism.

7. The transmission of claim 6, further comprising:
- a communicating section communicating the oil containing space of the oil storage with the internal space of the transmission case; and
- a communicating section valve configured to open and close the communicating section.

8. The transmission of claim 1, further comprising:
- a communicating section communicating the oil containing space of the oil storage with the internal space of the transmission case; and
- a communicating section valve configured to open and close the communicating section.

\* \* \* \* \*